US011417109B1

(12) United States Patent
Theimer et al.

(10) Patent No.: US 11,417,109 B1
(45) Date of Patent: Aug. 16, 2022

(54) NETWORK-BASED VEHICLE EVENT DETECTION SYSTEM

(71) Applicant: Amazon Technologies, Inc., Seattle, WA (US)

(72) Inventors: Marvin Michael Theimer, Seattle, WA (US); Roger Shane Barga, Woodinville, WA (US); William J. Vass, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/926,987

(22) Filed: Mar. 20, 2018

(51) Int. Cl.
| | |
|---|---|
| *G06V 20/56* | (2022.01) |
| *H04W 4/44* | (2018.01) |
| *H04L 67/125* | (2022.01) |
| *B60R 25/30* | (2013.01) |
| *G06N 20/00* | (2019.01) |
| *G06V 20/59* | (2022.01) |

(52) U.S. Cl.
CPC ............ *G06V 20/56* (2022.01); *B60R 25/305* (2013.01); *G06N 20/00* (2019.01); *G06V 20/59* (2022.01); *H04L 67/125* (2013.01); *H04W 4/44* (2018.02)

(58) Field of Classification Search
CPC . G06K 9/00791; G06K 9/00832; H04W 4/44; G06N 20/00; B60R 25/305; H04L 67/125
See application file for complete search history.

(56) References Cited

U.S. PATENT DOCUMENTS

| | | | | |
|---|---|---|---|---|
| 8,948,499 | B1* | 2/2015 | Medasani | G06K 9/469 382/159 |
| 9,569,959 | B1* | 2/2017 | Sprague | G08G 1/0104 |
| 9,805,601 | B1* | 10/2017 | Fields | G08G 1/096791 |
| 10,643,285 | B1* | 5/2020 | Tofte | G06Q 40/08 |
| 2008/0255911 | A1* | 10/2008 | Khosla | G01S 5/0294 705/7.38 |
| 2012/0134532 | A1* | 5/2012 | Ni | G06K 9/00785 382/103 |

(Continued)

OTHER PUBLICATIONS

Matus et al. U.S. Appl. No. 62/575,126, filed Oct. 20, 2017.*

(Continued)

*Primary Examiner* — Nay Tun
(74) *Attorney, Agent, or Firm* — Robert C. Kowert; Kowert, Hood, Munyon, Rankin & Goetzel, P.C.

(57) ABSTRACT

An event detection system for detecting events related to vehicles based on sensor data from the vehicles. An event detection service on a network may receive streams of sensor data from vehicles and apply machine learning techniques to train models and to analyze the data to detect vehicle-related events. Supervised and unsupervised techniques may be used to train the models and to detect known as well as anomalous events. Events may be detected based on data from one or from multiple vehicles. The system may respond to events by alerting entities and/or signaling vehicle control systems to respond to the events. Trained models may be downloaded to vehicles; the vehicle computer systems can then locally detect events. The downloaded models can be further trained on the vehicles, uploaded to the network, and integrated into the network-based models to improve the performance of the models.

21 Claims, 19 Drawing Sheets

(56) References Cited

U.S. PATENT DOCUMENTS

| | | | |
|---|---|---|---|
| 2013/0241730 A1* | 9/2013 | Saitwal | H04N 7/002 340/540 |
| 2015/0022630 A1* | 1/2015 | Shafir | H04N 5/2354 348/38 |
| 2016/0093212 A1* | 3/2016 | Barfield, Jr. | G08G 1/0133 348/144 |
| 2016/0349330 A1* | 12/2016 | Barfield, Jr. | G07C 5/0816 |
| 2017/0357866 A1* | 12/2017 | Welland | G06K 9/00812 |
| 2018/0107901 A1* | 4/2018 | Nakamura | G06T 7/00 |
| 2018/0148051 A1* | 5/2018 | Lujan | G08G 1/202 |
| 2018/0150701 A1* | 5/2018 | Kang | G06K 9/4623 |
| 2018/0165963 A1* | 6/2018 | Lai | G08G 1/0141 |
| 2018/0174457 A1* | 6/2018 | Taylor | G08G 1/096716 |
| 2018/0189581 A1* | 7/2018 | Turcot | G06K 9/4628 |
| 2018/0257661 A1* | 9/2018 | Kroop | B60W 50/0098 |
| 2018/0300964 A1* | 10/2018 | Lakshamanan | G06N 3/063 |
| 2018/0322413 A1* | 11/2018 | Yocam | G06N 20/00 |
| 2018/0322711 A1* | 11/2018 | Weimerskirch | B60W 50/0225 |
| 2019/0061620 A1* | 2/2019 | Inaba | G08G 1/04 |
| 2019/0122543 A1* | 4/2019 | Matus | G08G 1/0112 |
| 2019/0135231 A1* | 5/2019 | Sakuma | B60R 25/305 |
| 2019/0349394 A1* | 11/2019 | Kishikawa | H04L 63/062 |

OTHER PUBLICATIONS

C. Reichert, "Ericcson launches Connected Vehicle Marketplace", Retrieved from URL: http://www.zdnet.com/article/ericsson-launches-connected-vehicle-marke . . . , pp. 1-4, Feb. 27, 2017.

Mariusz Bojarski, et al., "Explaining How a Deep Neural Network Trained with End-to-End Learning Steers a Car", Retrieved from arXiv:1704.07911v1 [cs.CV] Apr. 25, 2017, pp. 1-8.

* cited by examiner

NETWORK-BASED VEHICLE EVENT DETECTION SYSTEM

BACKGROUND

Many companies and other organizations operate computer networks that interconnect numerous computer systems to support their operations, such as with the computer systems being co-located (e.g., as part of a local network) or instead located in multiple distinct geographical locations (e.g., connected via one or more private or public intermediate networks). For example, data centers housing significant numbers of interconnected computer systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Figure 1:
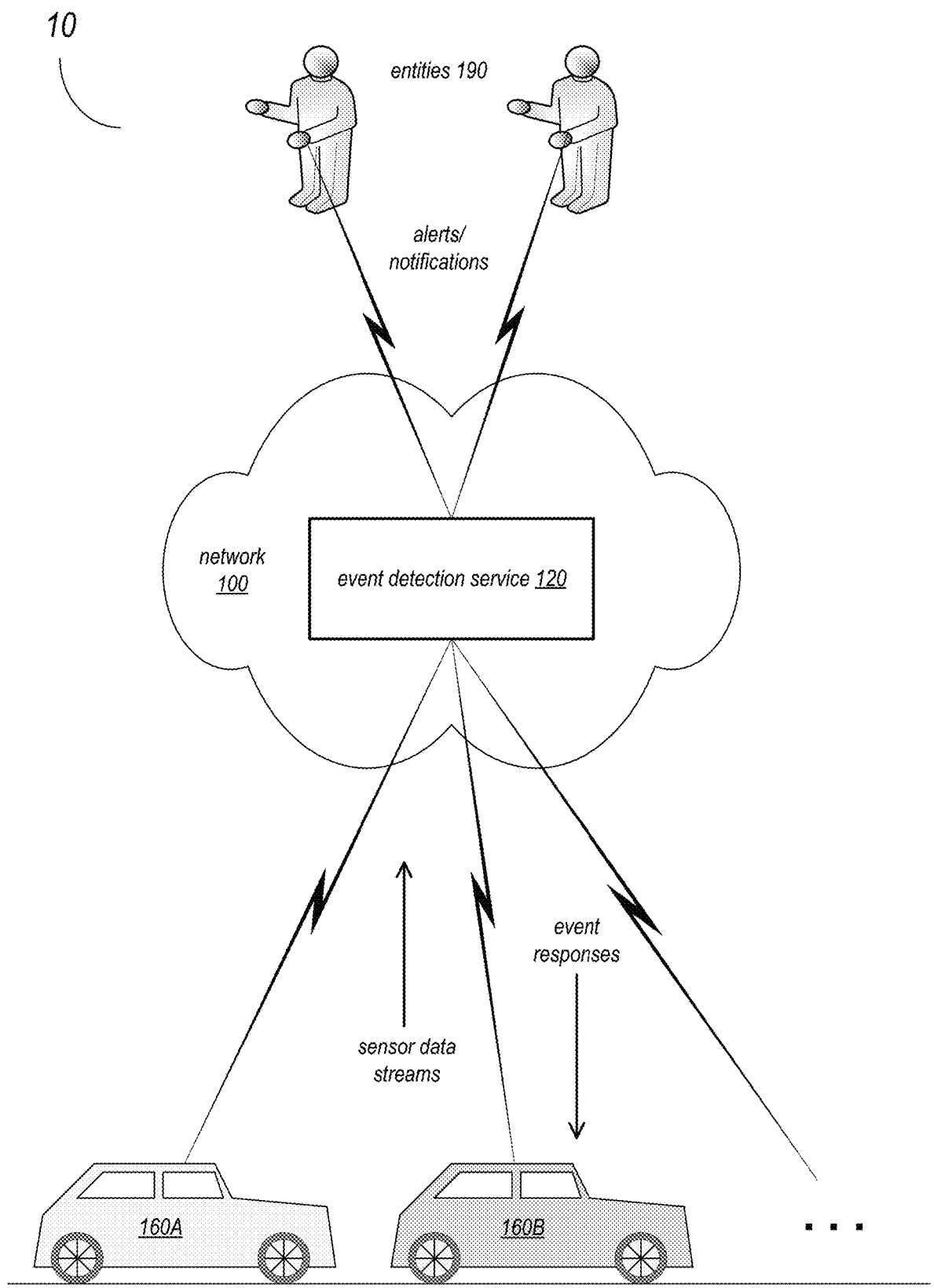
FIG. 1 graphically illustrates a network-based event detection system, according to some embodiments.

Various embodiments of methods and apparatus for detecting events related to vehicles in real-world environments are described. FIG. 1 graphically illustrates a network-based event detection system 10, according to some embodiments. In embodiments of the event detection system 10, machine learning techniques, including but not limited to deep learning techniques such as deep learning neural networks, may be applied to sensor data streamed to an event detection service 120 on a network 100 via wireless connections from various sensors on vehicles 160 to detect various events related to the vehicles 160. In some embodiments, machine learning models may be trained by the event detection service 120, stored on the network 100, and used in detecting various types of events using machine learning techniques. In some embodiments, supervised and unsupervised machine learning techniques may be used to detect events. The event detection system 10 may respond to detected events, for example by notifying or alerting one or more entities of the events and/or by causing vehicle systems to respond to the events.

In some embodiments, copies of trained models may be downloaded from the network 100 to vehicles 160. Event detection software modules executing on computing systems of the vehicles 160 can then use the models to locally detect events using machine learning techniques. In some embodiments, the downloaded models are further trained by event detection on the vehicles 160. Initially, a model in a particular vehicle 160 may not detect any new anomalous conditions, but may learn over time what "normal" looks like for the vehicle, the routes the vehicle travels, and the environmental conditions the vehicle encounters, and thus be able to better recognize anomalous conditions for the vehicle and for the physical environment around the vehicle. In some embodiments, models that have been further trained on multiple vehicles 160 can be uploaded from the vehicles 160 and integrated into the models on the network 100 to improve the performance of the models. Copies of the integrated models can then be downloaded to the vehicles 160, further trained, uploaded and integrated, and so on. Thus, the models used in the event detection system 10 may be improved over time based on information collected from multiple vehicles 160 operating in real environments. The models learn more and thus become richer and better able to distinguish normal and anomalous conditions as they are deployed to more and more vehicles 160.

Vehicles to which embodiments of the event detection system 10 may be applied may include, but are not limited to, automobiles, trucks, buses, motorcycles, ATVs, etc. The vehicles may include personal vehicles, for example cars owned or leased by individuals, as well as commercial vehicles such as taxis, buses, and rental vehicles. However, note that embodiments of the event detection system 10 may also be applied to watercraft (boats, ships, etc.) and aircraft (airplanes, helicopters, drones, etc.). Further, embodiments of the event detection system 10 may be applied to detect events in other environments than vehicles, for example in homes, businesses, or other buildings or structures.

Sensors on the vehicles 160 may include one or more of, but are not limited to, video cameras, motion sensors, accelerometers, range sensors, audio sensors, temperature sensors, global positioning sensors, engine sensors, throttle sensors, brake sensors, transmission sensors, suspension sensors, and steering sensors. Vehicle systems that may be affected by the event detection system may include one or more of, but are not limited to, ignition systems, engine control systems, throttle control systems, brake control systems, steering control systems, transmission control systems, suspension systems, vehicle light systems, vehicle alarm systems, vehicle lock systems, climate control systems, audio systems, display systems, and navigation systems. Entities that may be alerted or notified of vehicle-related events may include one or more of, but are not limited to, authorities (e.g., police, EMS, etc.) and vehicle owners (i.e., persons who own, rent or lease a given vehicle).

Events may be detected by the event detection system 10 while the vehicles 160 are stationary (i.e., parked) or in motion, occupied or unoccupied. Events that may be detected by the event detection system 10 may include one or more of, but are not limited to, events inside a vehicle 160 (internal events), events outside a vehicle 160 (external events), events related to occupants (e.g., the driver or a passenger) of a vehicle 160, and events related to one or more vehicle systems (e.g., the engine, suspension, etc.) External events may include events related to road and traffic conditions around the vehicle that may be used in directing the operation of the vehicle by the driver and/or by the vehicle systems, and events in the physical environment around the vehicle that are not related to road and traffic conditions. Events may be detected based on sensor data from one or more internal and/or external sensors of one vehicle 160, or based on combined sensor data from one or more external sensors of two or more vehicles 160. Supervised machine learning methods may be used to detect known events based on trained models. Unsupervised machine learning methods may be used to infer or predict anomalous events.

Embodiments of the event detection system 10 may leverage the machine learning models and the sensor data collected by the external sensors on vehicles 160 (e.g., external cameras) to make inferences or predictions about the physical environment around the vehicles 160. In addition to detecting events related to road and traffic conditions that may generate signals to the vehicle systems or alerts to the drivers, embodiments of the event detection system 10 may infer or predict anomalies in the general physical environment around the vehicles 160 that are not related to road or traffic conditions. As an example, the external video cameras (and/or other external sensors) of one or more vehicles 160 may collect sensor data for a particular route or location over time. The sensor data may be applied to one or more models that learn to recognize the "normal" for the route or location, the traffic on the route or at the location, and the general physical environment along that route or at that location (e.g., the roadside, landscape, structures including buildings, sidewalks, trees, parks, rivers, hillsides, etc.) over time. In addition to detecting events related to traffic along the route or at the location, the trained models may infer that something in the physical environment along the route or at the location is different than normal. Information from multiple vehicles 160 traveling the route or traversing the location may be correlated and analyzed to infer or predict anomalies in the physical environment along the route or at the location. For example, anomalies in the physical environment such as a fire in a building or on a hillside, a potential crime in progress, or an unusually large crowd at a location may be inferred from video from the external video cameras of one or more vehicles 160 applied to one or more machine learning models using machine learning techniques. In response to a detected anomaly in the physical environment, the event detection system 10 may perform one or more actions such as alerting authorities of the anomaly.

The sensor data streamed to the event detection service 120 may include or be labeled with time and location (e.g., GPS) information. The time and location information may, for example, be used to correlate sensor data from two or more vehicles. In some embodiments, instead of or in addition to using time and location information, the sensor data may be analyzed using machine learning models to correlate sensor data from two or more vehicles. For example, video from external cameras of vehicles may be analyzed using machine learning models to detect features in the external environment. If the analysis determines that the external cameras of two or more of the vehicles are both capturing video of a known feature in the external environment (e.g., a particular building or other structure), then the system can infer that the two or more vehicles are at or near the same location in the environment, and can thus correlated the sensor data from the two or more vehicles. The correlated sensor data from two or more vehicles may, for example, be analyzed to detect, infer, or predict environmental anomalies such as potholes, unusually heavy traffic, etc.

Embodiments of the event detection system may, for example, be implemented in a provider network environment. A provider network may, for example, be a network 100 set up by an entity such as a company or a public sector organization (referred to as a service provider) to provide one or more services accessible via the Internet (such as various types of cloud-based computing or storage) to a distributed set of clients or customers. A provider network may include one or more data centers hosting various resource pools, such as collections of physical and virtualized computer servers, storage devices, networking equipment and the like, needed to implement and distribute the services offered by the service provider. An example provider network in which embodiments may be implemented is illustrated in FIGS. 13 through 16.

Figure 2A:
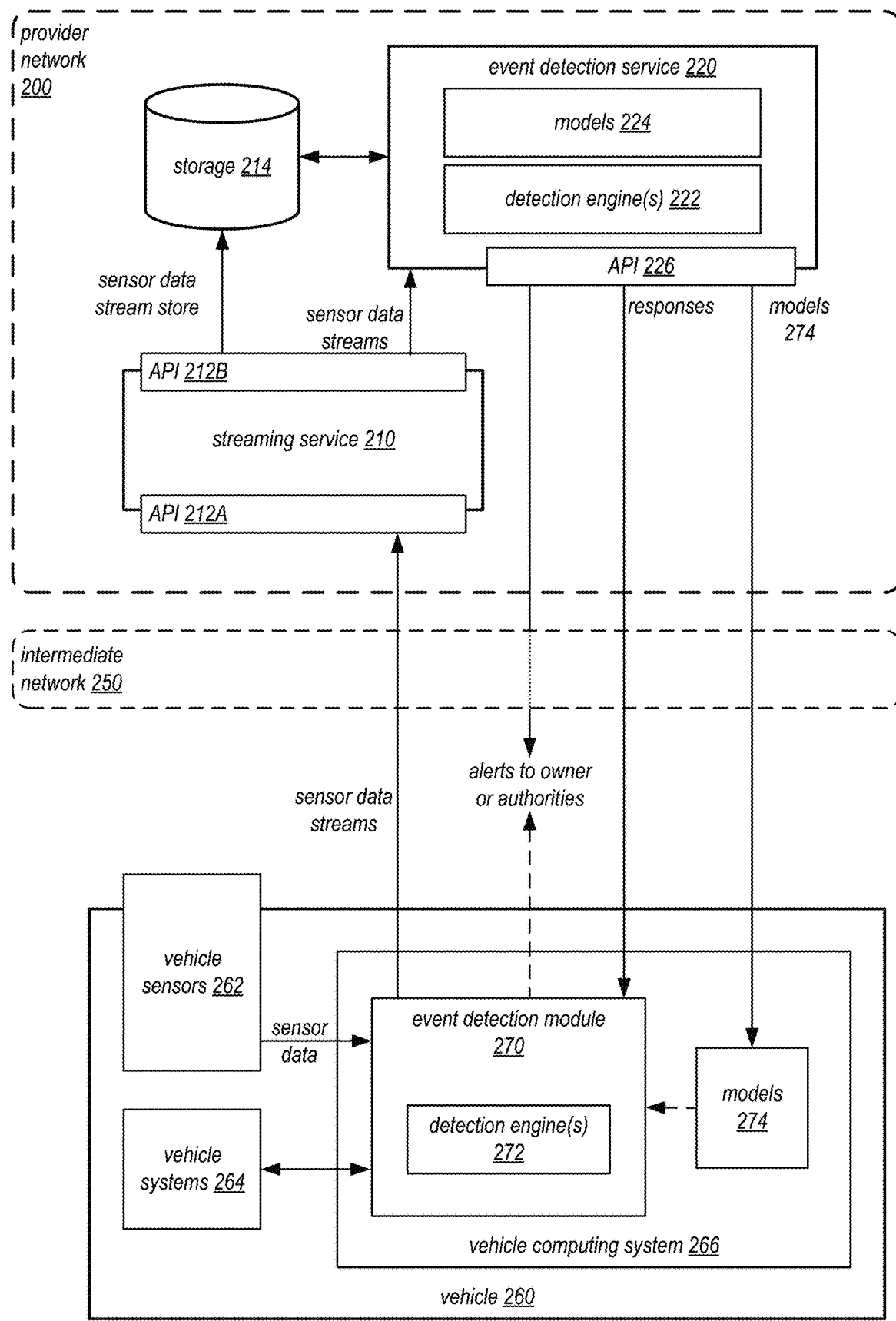
FIG. 2A illustrates a network-based event detection system for detecting and responding to events in a vehicle based on sensor data streamed to the network from the vehicle, according to some embodiments.
Figure 2B:
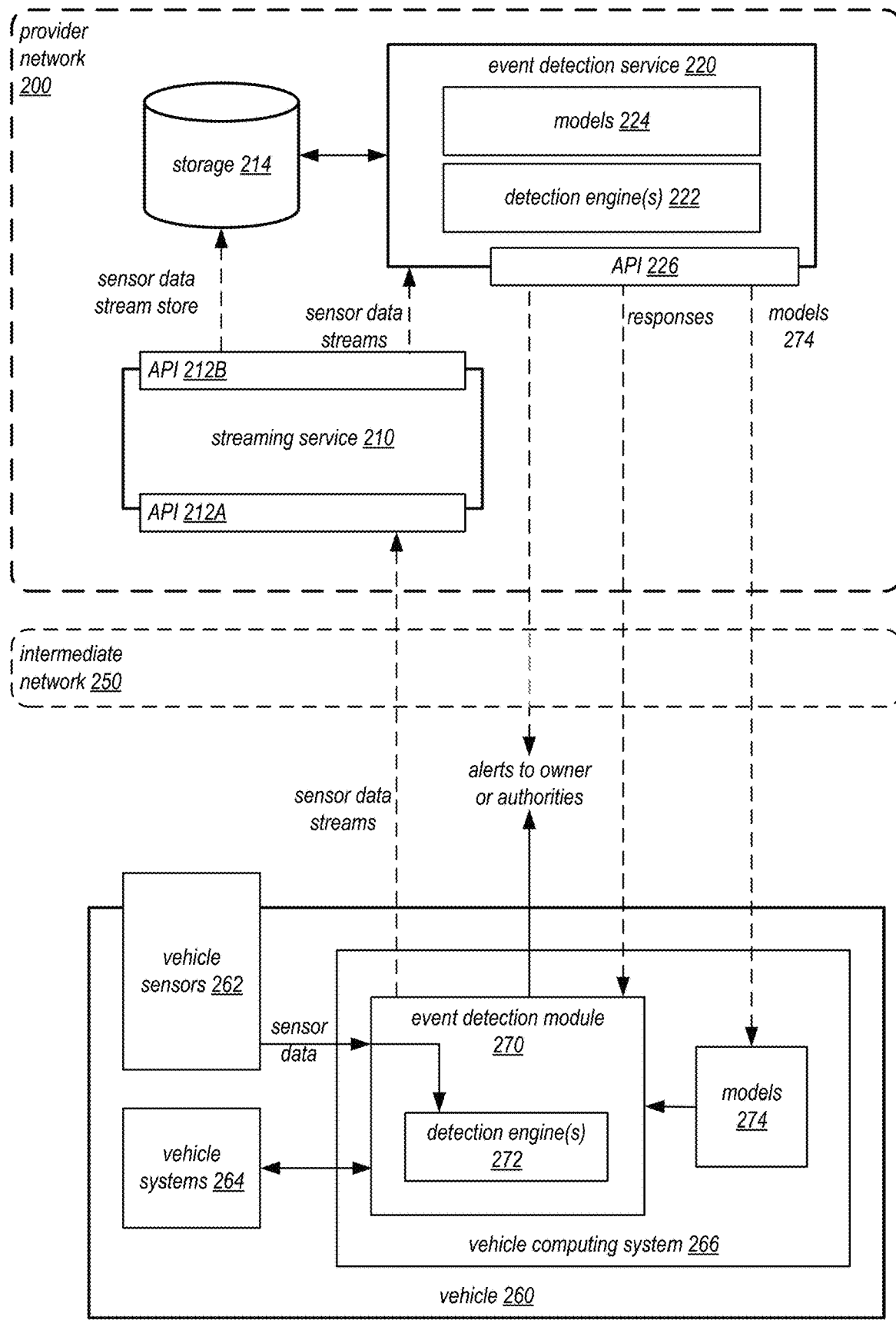
FIG. 2B illustrates a detection module in a vehicle detecting and responding to events related to the vehicle based on models generated by the event detection service on the network and downloaded to the vehicle from the network, according to some embodiments.

FIGS. 2A and 2B illustrate a network-based event detection system for detecting and responding to events in vehicles, according to some embodiments. FIGS. 2A and 2B show an example provider network 200 environment in which network-based components of an event detection system may be implemented. In some embodiments, the event detection system may include, but is not limited to, a streaming service 210 implemented on one or more devices on provider network 200, an event detection service 220 implemented on one or more devices on provider network 200, and network-based data storage 214 for storing sensor data streams, predictive models 224 trained and used by event detection service 220, user information and preferences, etc.

The streaming service 210 may provide one or more APIs 212 via which sensor data may be streamed to the service 210 and via which sensor data streams may be provided to the event detection service 220 and/or to storage 214.

In some embodiments, the event detection service 220 may include, but is not limited to, one or more detection engines 222 that may implement machine learning technology that may, for example, be used to train predictive models 224 for detecting vehicle-related events, and to detect vehicle-related events based on the models 224. Example machine learning technology that may be used include, but are not limited to, deep learning technology implemented by deep learning architectures such as deep neural networks. The machine learning techniques performed by the detection engines 222 may include supervised, semi-supervised, and/or unsupervised learning techniques. A supervised learning technique infers a function from labeled training data (e.g., training examples such as one or more images of a specific person's face). An unsupervised learning technique infers a function to describe hidden structure from "unlabeled" data. A semi-supervised learning technique is a type of supervised learning that also uses unlabeled data for training.

Embodiments of the event detection service 220 may leverage virtualization technology that allows services to be developed as machine images or containers that can be deployed to and executed in virtualization environments provided by platform virtualization software on host devices of the provider network 200. A machine image (MI) is a type of virtual appliance that is used to create a virtual machine (VM) that executes in a virtualization environment on a host device. A component of an MI is a read-only filesystem image that includes an operating system (OS) and any additional software required to deliver a service. A container is a stand-alone executable package that executes in a virtualization environment on a host device and that includes everything needed to execute a service in the virtualization environment: e.g., code, runtime, system tools, system libraries, and settings. A primary difference between containers and MIs/VMs is that containers provide a way to virtualize an OS in order for multiple workloads to run on a single OS instance, whereas with VMs, the hardware is virtualized to run multiple OS instances. Detection engines 222 may be implemented by a fleet of VMs or a fleet of containers deployed to host devices on the provider network 200. Each VM or container in the fleet may implement and execute one or more detection engines 222. The fleet can be expanded by launching new VMs or containers on host devices of the provider network 200 (or reduced by releasing VMs or containers) in response to changes in demand in the event detection system.

Models 224 may include models trained for particular customers (e.g., vehicle owners or drivers that participate in or subscribe to the network-based event detection system) that are used to detect events related to vehicles that the respective customers are associated with (e.g., owned vehicles, leased vehicles, rented vehicles, etc.) based on sensor data received from those vehicles. In some embodiments, when using a vehicle, a user may identify themselves to the event detection system so that the vehicle is associated with that user and that user's trained models are used for that vehicle. Models 224 may also include models trained for particular vehicles that are used to detect events related to those vehicles based on sensor data received from those vehicles regardless of the user. Models 224 may also include "generic" models that may be used to detect events related to one or more vehicles, or events related to groups or "cohorts" of vehicles, based on sensor data received from those vehicles. Models 224 may also include models for particular locations in the environment in which vehicles travel (e.g., streets, roads, and highways), for example models for streets or at intersections in an urban environment, interchanges on a freeway, and so on, that may be used to detect events related to those particular locations, for example current road and traffic conditions or anomalous road and traffic conditions, based on sensor data collected from vehicles that traverse those locations.

A vehicle 260 that participates in the network-based event detection system may include at least one integrated computing system 266 comprising one or more processors, memory, and data storage. The computing system 266 may provide a graphical user interface (GUI) via an integrated display for selecting and controlling various applications provided through the vehicle computing system 266, for example audio, navigation, climate control, and hands-free mobile phone applications. In some embodiments, the display may be a touch-enabled display, and at least some functionality of the applications provided by the computing system 266 may be accessed and controlled by touches or gestures to the GUI on the display. In some embodiments, at least some functionality of the applications provided by the computing system 266 may be accessed and controlled by physical controls, for example buttons or dials on the dashboard, steering wheel, and/or center console. In some embodiments, at least some functionality of the applications provided by the computing system 266 may be accessed and controlled by vocal commands.

In some embodiments, a local or "edge" event detection module 270 of the event detection system may be implemented as hardware and/or software in the vehicle computing system 266. The event detection module 270 may perform various vehicle-side tasks of the event detection system as described herein. In some embodiments, the event detection module 270 may include, but is not limited to, one or more detection engines 272 that may implement machine learning technology (e.g., deep neural network technology) that may, for example, be used to detect vehicle-related events based on models 274 downloaded to the vehicle 260 from the event detection service 220. In some embodiments, functionality of the event detection module 270 may be accessed and controlled via the computing system 266 GUI, by one or more physical controls, and/or by vocal commands.

In some embodiments, event detection module 270 may be implemented as one or more machine images or containers that can be deployed to and executed in a virtualization environment provided by platform virtualization software on the vehicle computing system 266.

A vehicle 260 that participates in the network-based event detection system may include one or more sensors 262 that collect sensor data that may be used by the event detection system to detect vehicle events. The sensors 262 may include sensors for the external environment around the vehicle 260 including one or more of but not limited to external video cameras, infrared (IR) cameras, motion sensors, range sensors, audio sensors, temperature sensors, and global positioning sensors. The sensors 262 may also include sensors for the environment within the vehicle 260 including one or more of but not limited to internal video cameras, IR cameras, motion sensors, accelerometers, audio sensors, temperature sensors, and weight or pressure sensors in the seats. The sensors 262 may also include sensors for the electrical and mechanical components of the vehicle including one or more of but not limited to engine sensors, throttle sensors, brake sensors, transmission sensors, suspension sensors, steering sensors, tire pressure sensors, and exhaust sensors. The sensors 262 may also include one or more sensors that detect touches on external or internal surfaces of the vehicle 262. The sensors 262 may also include one or more other sensors including but not limited to sensors that detect collisions of the vehicle 260 with objects in the environment (e.g., other vehicles), airbag deployment sensors, and door and trunk open/close and lock sensors. In general, sensors 262 may include any sensor that can collect sensor data about some aspect of the external or internal vehicle environment, or for a mechanical/electrical component of the vehicle 260. Note that a vehicle sensor 262 may include processors and memory, and may communicate with the vehicle computing system 266 and/or with one or more vehicle systems 266 via a wired or wireless connection.

The vehicle 260 may also include one or more vehicle systems 264 that may be affected by the event detection system in response to detected events. The vehicle systems 264 may include one or more of, but are not limited to, ignition systems, engine control systems, throttle control systems, brake control systems, steering control systems, transmission control systems, suspension systems, vehicle light systems, vehicle alarm systems, vehicle lock systems, climate control systems, audio systems, display systems, and navigation systems. Note that a vehicle system 264 may include processors and memory configured to provide control and monitoring functionality for the system 264, and may communicate with the vehicle computing system 266 via a wired or wireless connection.

In some embodiments, a customer may set up an account for using event detection service. In some embodiments, the event detection service 220 may provide one or more APIs 226 via which customers can subscribe to and participate in the event detection system via home computers, mobile devices, and/or vehicle computing systems 260. In some embodiments, a customer may subscribe to the event detection service 220 via the API(s) 226, may provide information (e.g., user profile and preference information, cell phone number, name, password, etc.) to the event detection service 220 via the API(s) 226, and may update their information via the API(s) 226. In some embodiments, other functions of the event detection system may be performed via the API(s) 226. For example, the event detection service 220 may download models 274 to vehicle computing systems 266 via API(s) 226, and may send response messages for detected events to event detection modules 270 via API(s) 226.

In some embodiments, a customer may provide digital photographs of the customer's face and/or other features as training data to the event detection service 220 that may be used to train a model 224 for use in facial recognition performed by a supervised learning technique. In some embodiments, the customer may also provide digital photographs of one or more other person's faces and/or other features as training data to the event detection service 220 that may be used to train models 224 for use in facial recognition performed by a supervised learning technique. In some embodiments, the customer may also provide information (e.g., user profile and preference information) for the one or more other persons that may use a vehicle associated with the customer. The trained model(s) may, for example, be used in detecting persons that are allowed (or not allowed) to access, start, and/or operate a particular vehicle associated with the customer. For example, a vehicle owner may configure their account to allow only themselves to operate the vehicle, or may add one or more other persons (e.g., family members) to the account as persons allowed to operate the vehicle. In some embodiments, the customer may specify restrictions on particular users added to their account that are allowed to operate the vehicle, for example particular hours when a user is allowed (or not allowed) to operate the vehicle, and/or particular locations that the user is allowed or not allowed to operate the vehicle. In some embodiments, instead of or in addition to using digital photographs of a person's face and/or other features to recognize persons using machine learning techniques, machine learning techniques may be applied to other features of persons (e.g., body features, voice, fingerprints, weight, etc.) and/or to preferences of persons (e.g., settings of vehicle systems (seat position, steering wheel position, mirror settings, climate and audio settings, etc.)) to train models for recognizing and identifying those persons.

In some embodiments, a customer may access the event detection service 220 through a GUI to the service 220 provided by the event detection module 270 to configure their account. For example, the GUI may provide an "add driver" UI element that, when selected, takes video or photo(s) of a person sitting in the driver's seat via internal camera(s). After capturing the image(s) of the person, the image(s) may be used as training data for a model that is used to detect allowed driver(s) of the vehicle. In some embodiments, other information (e.g., voice samples, fingerprints, weight, preferences, etc.) may be provided through the GUI and used as training data for model(s) that may be used to detect allowed driver(s) of the vehicle. Note that, in some embodiments, a customer may access the event detection service 220 via other methods, for example via a mobile phone application for the service 220 or via a web interface to the service 220. For example, in some embodiments, image(s) of persons to be added as allowed drivers may be provided to the service 220 by uploading the image(s) from a smartphone or home computer to the service 220.

FIG. 2A illustrates a network-based event detection system for detecting and responding to events in a vehicle based on sensor data streamed to an event detection service 220 on provider network 200 from a vehicle 260, according to some embodiments. In some embodiments, the event detection module 270 may collect sensor data from vehicle sensors 262 and stream the sensor data to a streaming service 210 on provider network 200 via a wireless network connection over an intermediate network 250 such as the Internet. In some embodiments, the streaming service 210 may perform some processing of the sensor data streams and forward at least some of the sensor data to the event detection service 220. In some embodiments, the streaming service 210 may also forward at least some of the sensor data to storage 214. One or more detection engines 222 of the event detection service 220 may then apply machine learning techniques to the sensor data using one or more models 224 to detect events in or around the vehicle 260.

In some embodiments, upon detecting an event, the event detection service 220 may send a response message to the event detection module 270 of the vehicle 260 via a wireless network connection over intermediate network 250. The response message may indicate an action that the event detection module 270 is to perform. For example, the indicated action may be to signal one or more of vehicle systems 264 to cause the vehicle system(s) 264 to perform some function in response to the detected event. Vehicle systems 264 that may be signaled by the event detection system in response to detected events may include one or more of, but are not limited to, ignition systems, engine control systems, throttle control systems, brake control systems, steering control systems, transmission control systems, suspension systems, vehicle light systems, vehicle alarm systems, vehicle lock systems, climate control systems, audio systems, display systems, and navigation systems. As a non-limiting example, the event detection service 220 may send a response to the event detection module 270 indicating that the ignition system is to be disabled in response to detecting that an unauthorized person is trying to start the vehicle 260 based on analysis of video images of the person that are streamed to the service 220 from the vehicle 260. As another example, the event detection service 220 may send a response to the event detection module 270 indicating that one or more systems 264 (e.g., the climate control system, audio system, etc.) are to be activated or modulated upon detecting that a person currently driving the vehicle is drowsy, nodding off, etc. based at least in part on analysis of video images of the person that are streamed to the service 220 from the vehicle 260.

In some embodiments, upon detecting certain events (e.g., unauthorized drivers, suspicious activity around a parked vehicle, accidents, etc.), the event detection service 220 may send alerts to the customer (e.g., the vehicle owner) and/or to authorities or other entities (e.g., EMT service, police, fire service, etc.). As a non-limiting example, the event detection service 220 may send a text message to a customer upon detecting that an unauthorized person is trying to enter or start the vehicle 260 based on analysis of video images of the person that are streamed to the service 220 from the vehicle 260, or that an authorized person is driving the vehicle 260 outside of the parameters (e.g., allowed times of operation) specified in that person's profile in the customer's account. As another example, the event detection service 220 may send a message to a police department upon detecting that a person currently driving the vehicle is behaving erratically or abnormally (e.g., is drowsy, nodding off, etc.) based on analysis of video images of the person that are streamed to the service 220 from the vehicle 260 and/or upon detecting that the vehicle 260 is being driven abnormally or dangerously (e.g., swerving, driving too slow or too fast, stopped in an unsafe location, etc.) based on analysis of sensor data from one or more vehicle systems 264.

FIG. 2B illustrates an event detection module 270 in a vehicle 260 detecting and responding to events related to the vehicle 260 based on models 274 generated by the event detection service 220 on the network 200 and downloaded to the vehicle 260 from the network 200, according to some embodiments. In some embodiments, the event detection module 270 may implement one or more detection engines 272 that may implement machine learning technology (e.g., deep neural network technology) that may, for example, be used to detect vehicle-related events based on models 274 generated by the event detection service 220 and downloaded to the vehicle 260 from the event detection service 220. For example, the event detection service 220 may generate models 224 on network 200 for a particular customer account using a supervised learning technique and/or using an unsupervised learning technique. One or more of the models 224 may be downloaded as models 274 to a vehicle 260 associated with the customer. The vehicle 260 may, for example, be a vehicle owned or leased by the customer, or alternatively may be a vehicle that the customer is temporarily using, for example a rental car or a car borrowed from a friend or family member.

In some embodiments, the event detection module 270 in a vehicle 260 may detect and respond to events related to the vehicle 260 based on the downloaded models 274 only under certain conditions, for example when a wireless connection to the provider network 200 is unavailable or unreliable, or in situations where a more immediate response than can be provided by the network-based service 220 is needed, such as collision avoidance.

In some embodiments, the event detection module 270 may collect sensor data from vehicle sensors 262. Instead of or in addition to streaming the sensor data to a streaming service 210 on provider network 200, at least some of the sensor data may be provided to one or more detection engines 272 of the event detection module 270 that apply machine learning techniques to the sensor data using one or more local models 274 to detect events in or around the vehicle 260.

In some embodiments, upon detecting an event, the event detection module 270 may signal one or more of vehicle systems 264 to cause the vehicle system(s) 264 to perform some function in response to the detected event. Vehicle systems 264 that may be signaled by the event detection module 270 in response to detected events may include one or more of, but are not limited to, ignition systems, engine control systems, throttle control systems, brake control systems, steering control systems, transmission control systems, suspension systems, vehicle light systems, vehicle alarm systems, vehicle lock systems, climate control systems, audio systems, display systems, and navigation systems. As a non-limiting example, the event detection module 270 may send a signal to the vehicle ignition system indicating that the ignition system is to be disabled in response to detecting that an unauthorized person is trying to start the vehicle 260 based on analysis of video images of the person captured by one or more internal cameras. As another example, the event detection module 270 may send signals to one or more systems 264 (e.g., the climate control system, audio system, etc.) to activate or modulate the system(s) upon detecting that a person currently driving the vehicle is drowsy, nodding off, etc. based on analysis of video images of the person captured by one or more internal cameras.

In some embodiments, upon detecting certain events (e.g., unauthorized drivers, suspicious activity around a parked vehicle, accidents, etc.), the event detection module 270 may send alerts to the customer (e.g., the vehicle owner) and/or to authorities or other entities (e.g., EMS service, police, fire service, etc.). As a non-limiting example, the event detection module 270 may send a text message to a customer upon detecting that an unauthorized person is trying to enter or start the vehicle 260 based on analysis of video images of the person, or that an authorized person is driving the vehicle 260 outside of the parameters (e.g., allowed times of operation) specified in that person's profile in the customer's account. As another example, the event detection module 270 may send a message to a police department upon detecting that a person currently driving the vehicle is behaving erratically or abnormally (e.g., is drowsy, nodding off, etc.) based on analysis of video images of the person and/or upon detecting that the vehicle 260 is being driven abnormally or dangerously (e.g., swerving, driving too slow or too fast, stopped in an unsafe location, etc.) based on analysis of sensor data from one or more vehicle systems 264.

Figure 3:
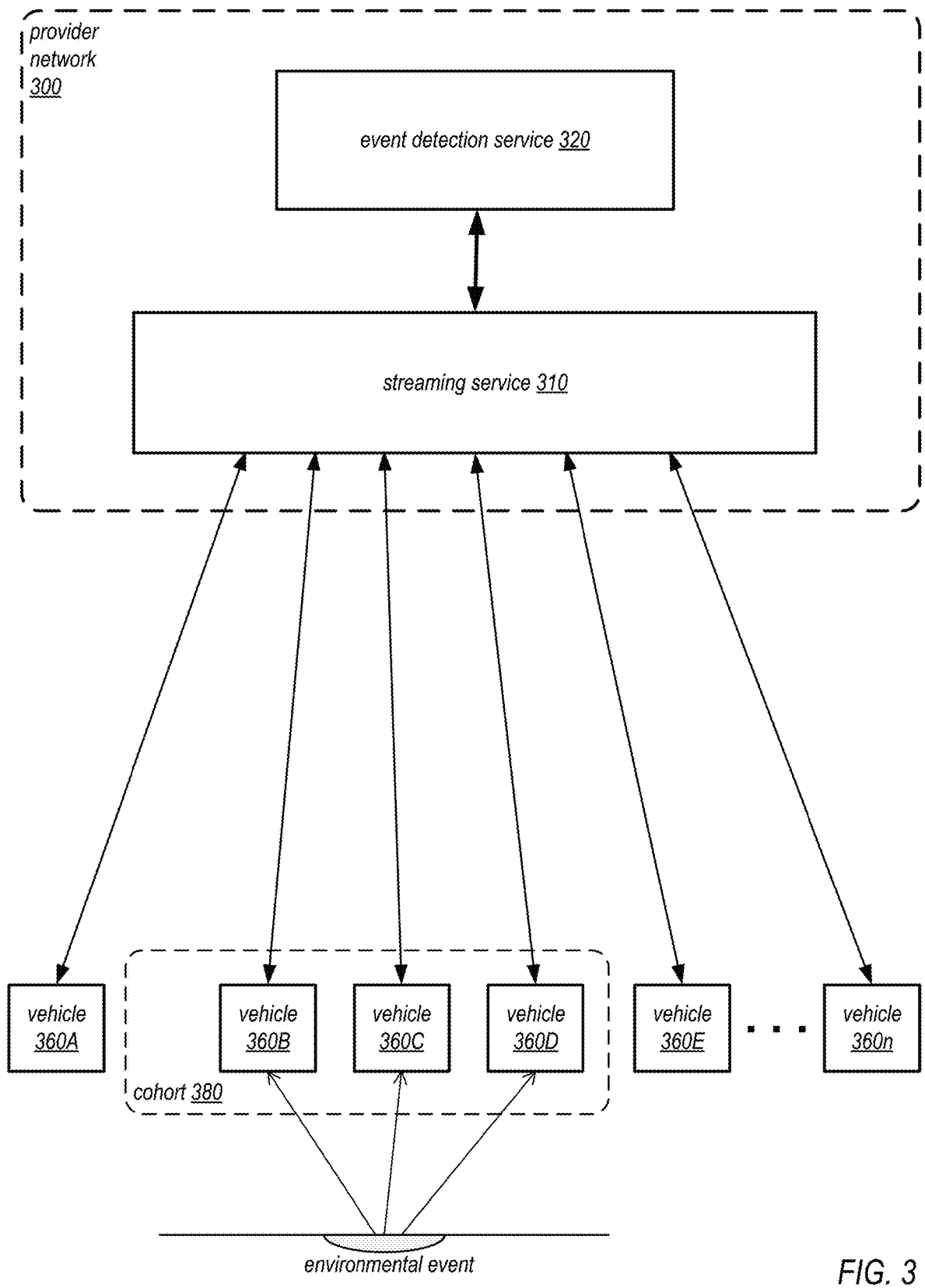
FIG. 3 illustrates the event detection system detecting and responding to events based on cohorts of vehicles, according to some embodiments.

FIG. 3 illustrates the event detection system detecting and responding to events based on cohorts of vehicles, according to some embodiments. FIGS. 2A and 2B primarily illustrate processing sensor data from a single vehicle to detect events related to that vehicle. However, as shown in FIG. 3, any number of vehicles (vehicles 360A-360n, in this example) may concurrently stream sensor data to the event detection service 320 via streaming service 310, and the event detection service 320 may concurrently process the streamed data to detect events related to the vehicles 360A-360n and send responses to the detected events to the vehicles 360A-360n. The sensor data from the vehicles 360A-360n may be tagged with metadata including but not limited to timestamps, location information (e.g., GPS coordinates), and information identifying the customer and/or vehicle, and may also include other information such as direction of travel, route information (e.g., based on information from a navigation system in the vehicles 360A-360n), speed of the vehicle, etc.

In some embodiments, the streaming service 310 and/or event detection service 320 may use the metadata and/or other information in the sensor data streams (e.g., video streams from the external cameras) from vehicles 360A-360n to correlate one or more vehicles 360 according to location, proximity, time, direction of travel, route, and/or other common factors, and may form groups or cohorts 380 of two or more vehicles 360 based on this information. For example, in FIG. 3, the event detection service 320 has identified vehicles 360B, 360C, and 360D as a cohort, for example based at least in part on the vehicles' current location. At least some of the sensor data from the vehicles 360 in the cohort 380 may be collectively analyzed by detection engine(s) of the service 320, for example using unsupervised learning techniques, to detect features and events in the environment at or near that location. For example, vehicles 360 in a cohort 380 (e.g., vehicles 360B, 360C, and 360D) may traverse the same street, and the service 320 may detect vibrations from suspension sensor data from some or all of the vehicles 360 in the cohort 380 at a particular location in the street that may correspond to an anomalous condition such as a pothole. As another example, vehicles 360 in a cohort 380 (e.g., vehicles 360B, 360C, and 360D) may traverse the same route, and the service 320 may detect that the vehicles all slow down for some distance at a particular location on the route based on sensor data from some or all of the vehicles 360 in the cohort 380; the location may thus be identified as experiencing heavy traffic caused by an anomalous condition. An indication of the anomalous condition may then be communicated to the event detection modules in other vehicles 360, which may then take some action in response to the detected environmental event, for example alerting the drivers and/or authorities of the anomalous condition, recommending alternative routes, slowing the vehicles when approaching a detected pothole, etc.

In addition to detecting events related to road and traffic conditions that may generate signals to the vehicle systems or alerts to the drivers, embodiments of the event detection system may use unsupervised machine learning techniques to infer or predict anomalies in the physical environment around the vehicles 360 that are not related to road or traffic conditions. As an example, the external video cameras (and/or other external sensors) of one or more vehicles 360 may collect sensor data for a particular route or location over time. The sensor data may be applied to one or more models that learn to recognize the "normal" for the route or location, the traffic on the route or at the location, and the physical environment along that route or at that location (e.g., the roadside, landscape, structures including buildings, sidewalks, trees, parks, rivers, hillsides, etc.) over time. In addition to detecting events related to traffic along the route or at the location, the trained models may infer that something in the physical environment along the route or at the location is different than normal. Information from multiple vehicles 360 traveling the route or traversing the location may be correlated and analyzed to infer or predict anomalies in the physical environment along the route or at the location. For example, anomalies in the physical environment such as a fire in a building or on a hillside, a potential crime in progress, or an unusually large crowd at a location may be inferred from video from the external video cameras of one or more vehicles 360 applied to one or more machine learning models using machine learning techniques. In response to a detected anomaly in the physical environment, the event detection system may perform one or more actions such as alerting authorities of the anomaly.

Figure 4:
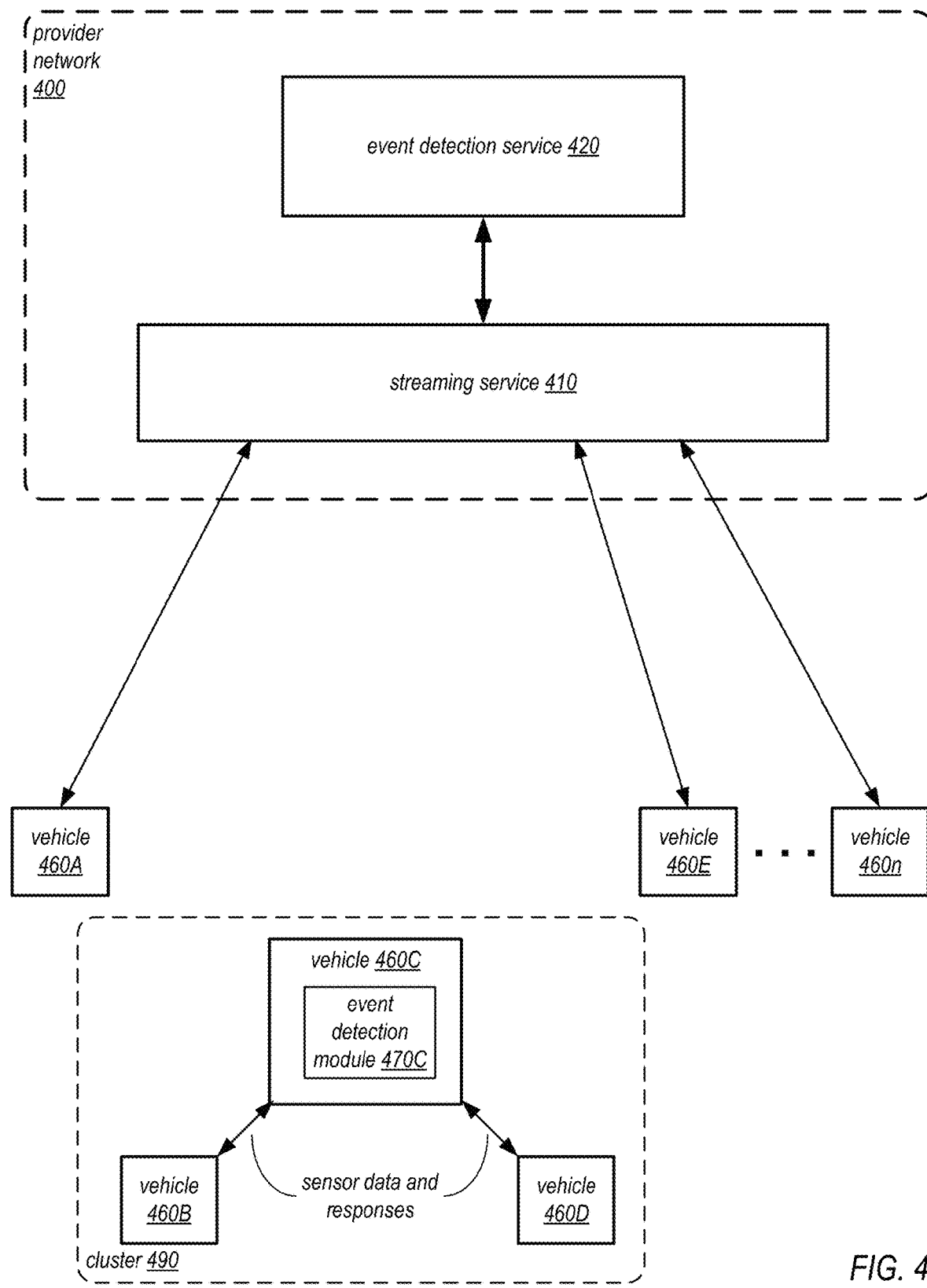
FIG. 4 illustrates a local detection module of a vehicle acting as a processing hub for other vehicles, according to some embodiments.

FIG. 4 illustrates a local detection module of a vehicle acting as a processing hub for other vehicles, according to some embodiments. In some conditions, a wireless connection to the provider network 400 may be unavailable or unreliable to two or more vehicles 460, for example vehicles 460B, 460C, and 460D. In some embodiments, when a wireless connection to the provider network 400 is unavailable or unreliable, the event detection module 470 of one or more of the vehicles 460 may attempt to establish a wireless connection (e.g., using local Wi-Fi) to an event detection module 470C in a vehicle 460 that acts as a local hub for the event detection system, thus forming a local cluster 490 of vehicles 460. In some embodiments, the vehicle computing system of the vehicle 460 that provides the local hub functionality may be a particularly powerful system that is capable of providing more processing power than the systems in the other vehicles 460 in the cluster 490. In this example, event detection module 470C of vehicle 460C acts as a local hub for vehicles 460B and 460D. Sensor data from vehicles 460B and 460D may be streamed to the event detection module 470C of vehicle 460C via wireless connections, processed using supervised or unsupervised learning techniques to detect events for vehicles 460B and 460D, with responses for detected events sent to the respective vehicles 460 via the wireless connections. In some embodiments, in addition to detecting events for other vehicles in the cluster 490, the event detection module 470C of vehicle 460C may also be used to detect environmental events for vehicles in the cluster 490 based on sensor data from two or more of the vehicles in the cluster 490 using unsupervised learning techniques as described in reference to FIG. 3.

Figure 5:
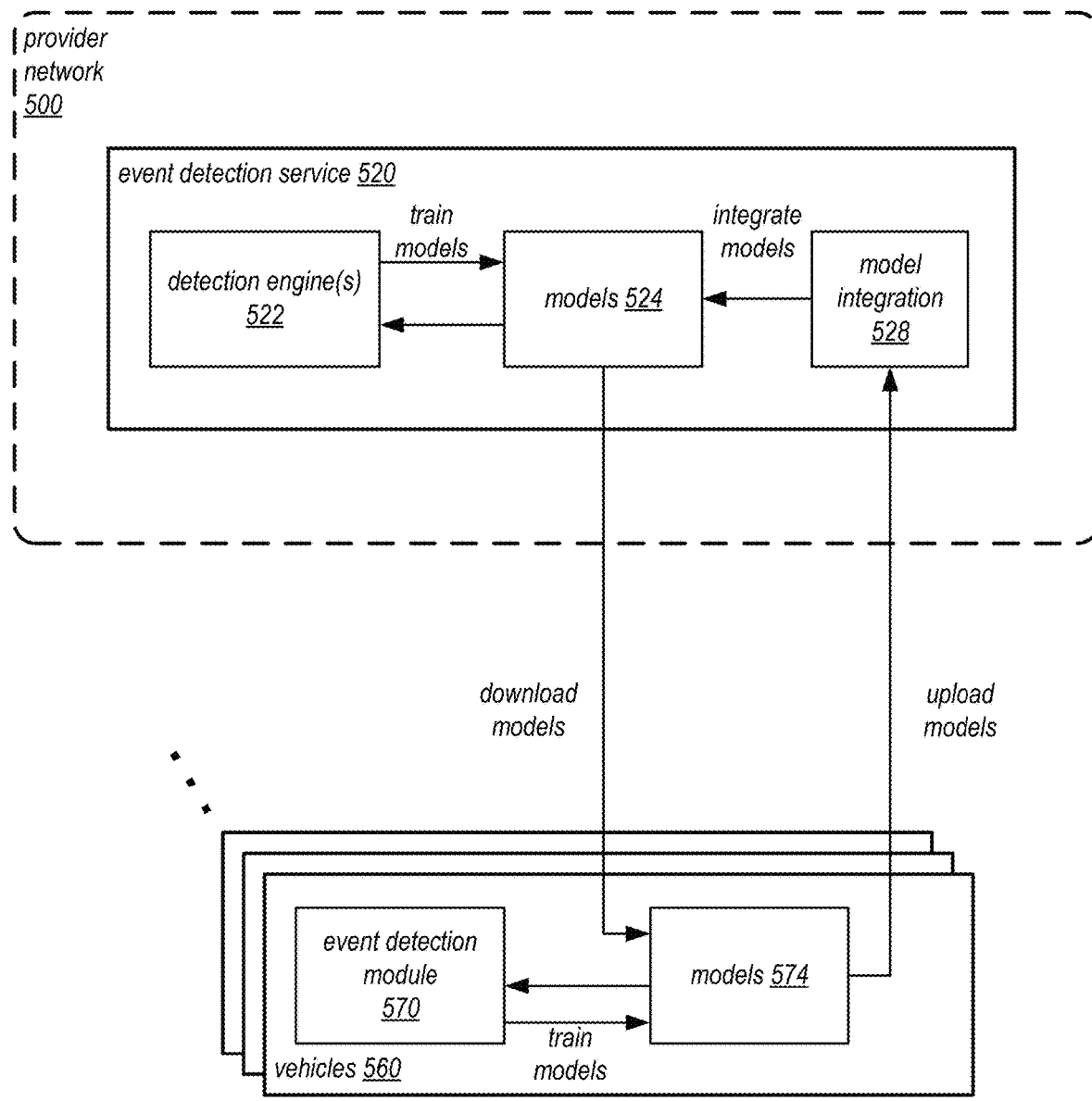
FIG. 5 illustrates integrating models from vehicles into the network-based models to improve the performance of the models, according to some embodiments.

FIG. 5 illustrates integrating models from vehicles into the network-based models to improve the performance of the models used in the event detection system, according to some embodiments. In some embodiments, models 524 may be initially trained by the event detection service 520. Copies of the trained models 524 may be downloaded from the network 500 to one or more vehicles 560 as models 574. Event detection modules 570 executing on computing systems of the vehicles 560 can then use the models 574 to locally detect events using machine learning techniques. The downloaded models 574 are further trained by the event detection modules 570 on the vehicles 560. Initially, a model 574 in a particular vehicle 560 may not detect new anomalous conditions or events, but may learn over time what "normal" looks like for the particular vehicle, the routes the vehicle travels, and the environmental conditions the vehicle encounters, and thus be able to recognize new anomalous conditions and events for this vehicle. In some embodiments, models 574 that have been further trained on multiple vehicles 560 can be uploaded from the vehicles 560 and integrated 528 into the models 524 on the network 500 to improve the performance of the models 524. Copies of the integrated models 524 can then be downloaded to vehicles 560, further trained, uploaded and integrated, and so on. Thus, the models 524 and 574 used in the event detection system may be improved over time based on information collected from multiple vehicles 560 operating in real environments. The models 524 and 574 learn more and thus become richer and better able to distinguish normal and anomalous conditions as they are deployed to more and more vehicles 560.

Figure 6A:
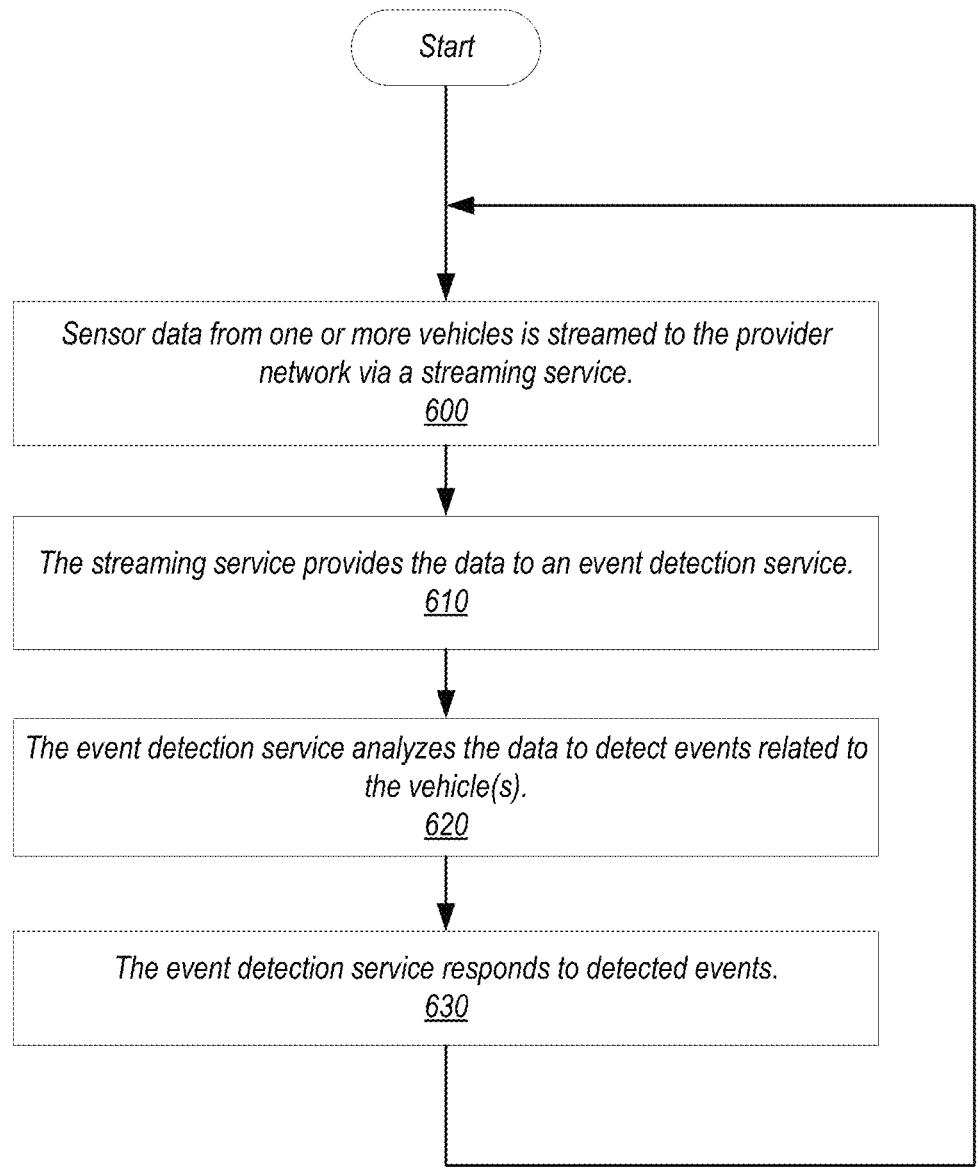
FIGS. 6A and 6B illustrate a network-based method for detecting and responding to events related to vehicles, according to some embodiments.

FIG. 6A illustrates a network-based method for detecting and responding to events related to vehicles, according to some embodiments. As indicated at 600, sensor data from one or more vehicles is streamed to the provider network over wireless connections via a streaming service of the provider network. As indicated at 610, the streaming service provides the sensor data to an event detection service of the provider network. As indicated at 620, the event detection service analyzes the data to detect events related to the vehicle(s). In some embodiments, supervised and unsupervised machine learning techniques may be used to detect events. As indicated at 630, the event detection service responds to detected events, for example by notifying or alerting one or more entities of the events and/or by causing vehicle systems of one or more vehicles to respond to the events.

Figure 6B:
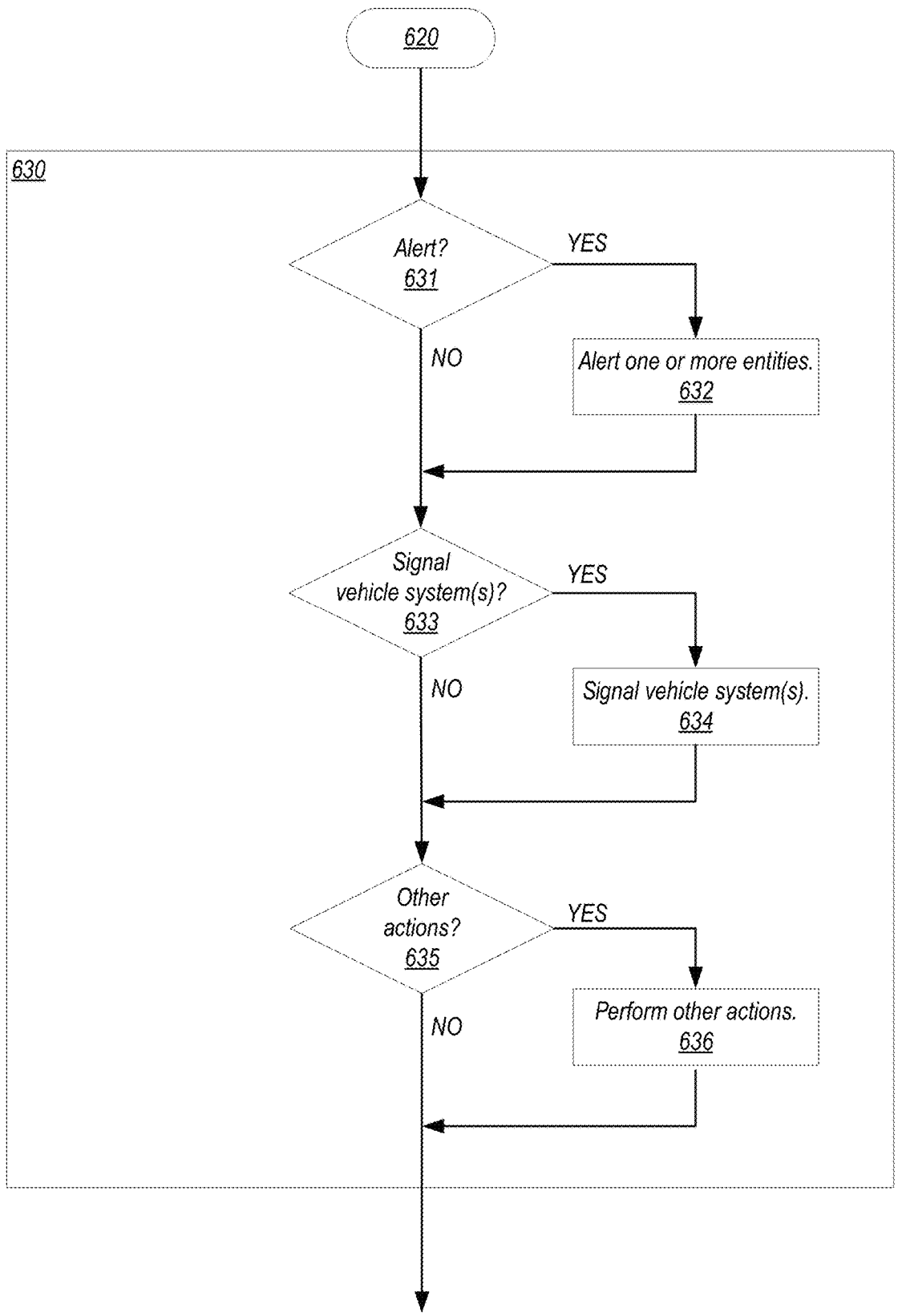

FIG. 6B illustrates a method for responding to events at element 630 of FIG. 6A, according to some embodiments. Different actions may be taken in response to events based on factors including, but not limited to, the event type and user preferences. At 631, if an alert is required, then one or more entities may be alerted or notified of the event as indicated at 632. Entities that may be alerted or notified of vehicle-related events may include one or more of, but are not limited to, authorities (e.g., police, EMS, etc.) and vehicle owners (i.e., persons who own, rent or lease a given vehicle). At 633, if the event requires action by one or more vehicle systems, then the vehicle system(s) may be signaled to perform an indicated action or actions, as indicated at 634. For example, the event detection service on the provider network may detect events related to the vehicles, and may send response messages to event detection modules in the vehicles indicating actions that should be taken by one or more vehicles systems. The event detection modules may then signal the vehicle systems to take the indicated actions. Vehicle systems that may be signaled by the event detection system to take some action in response to an event may include one or more of, but are not limited to, ignition systems, engine control systems, throttle control systems, brake control systems, steering control systems, transmission control systems, suspension systems, vehicle light systems, vehicle alarm systems, vehicle lock systems, climate control systems, audio systems, display systems, and navigation systems. At 635, if one or more other action should be performed in response to an event, then the other action(s) may be performed as indicated at 636. As an example, an anomalous event (e.g., a pothole, road obstruction, or unusually heavy traffic) detected from sensor data collected from one or more vehicles may result in the event detection system signaling vehicle system(s) in one or more other vehicles to take some action and/or alerting drivers of one or more other vehicles of the event.

Figure 7:
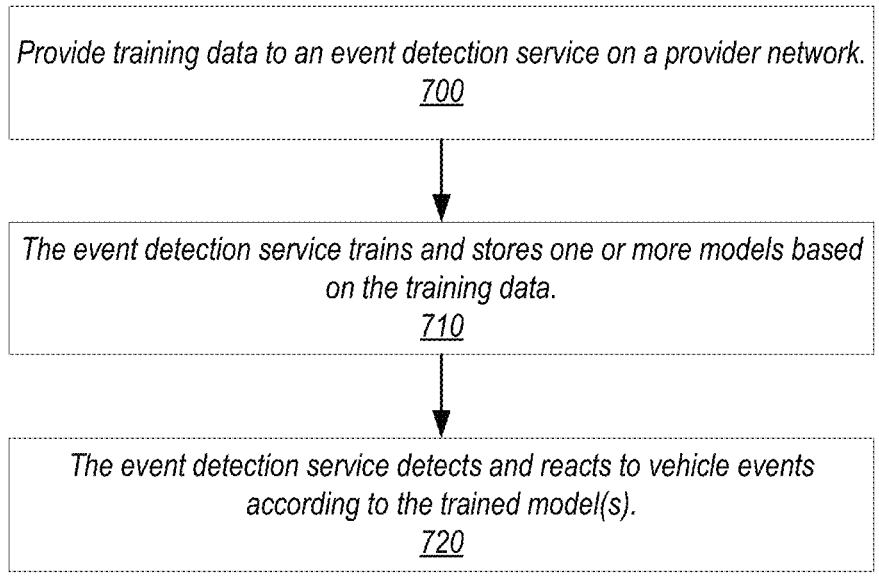
FIG. 7 is a high-level flowchart of method for detecting and responding to events related to vehicles using supervised learning, according to some embodiments.

FIG. 7 is a high-level flowchart of a method for detecting and responding to events related to vehicles using supervised learning, according to some embodiments. As indicated at 700, training data may be provided to an event detection service on a provider network. As indicated at 710, the event detection service trains and stores one or more models based on the training data. As indicated at 720, the event detection service detects and reacts to vehicle events according to the trained model(s). As an example, in some embodiments, a customer may provide digital photographs of the customer's face and/or other features as training data to the event detection service that may be used to train a model for use in facial recognition performed by a supervised learning technique. In some embodiments, the customer may also provide digital photographs of one or more other person's faces and/or other features as training data to the event detection service that may be used to train models for use in facial recognition performed by a supervised learning technique. In some embodiments, instead of or in addition to using digital photographs of a person's face and/or other features to recognize persons using machine learning techniques, machine learning techniques may be applied to other features of persons (e.g., body features, voice, fingerprints, weight, etc.) and/or to preferences of persons (e.g., settings of vehicle systems (seat position, steering wheel position, mirror settings, climate and audio settings, etc.)) to train models for recognizing and identifying those persons.

Figure 8:
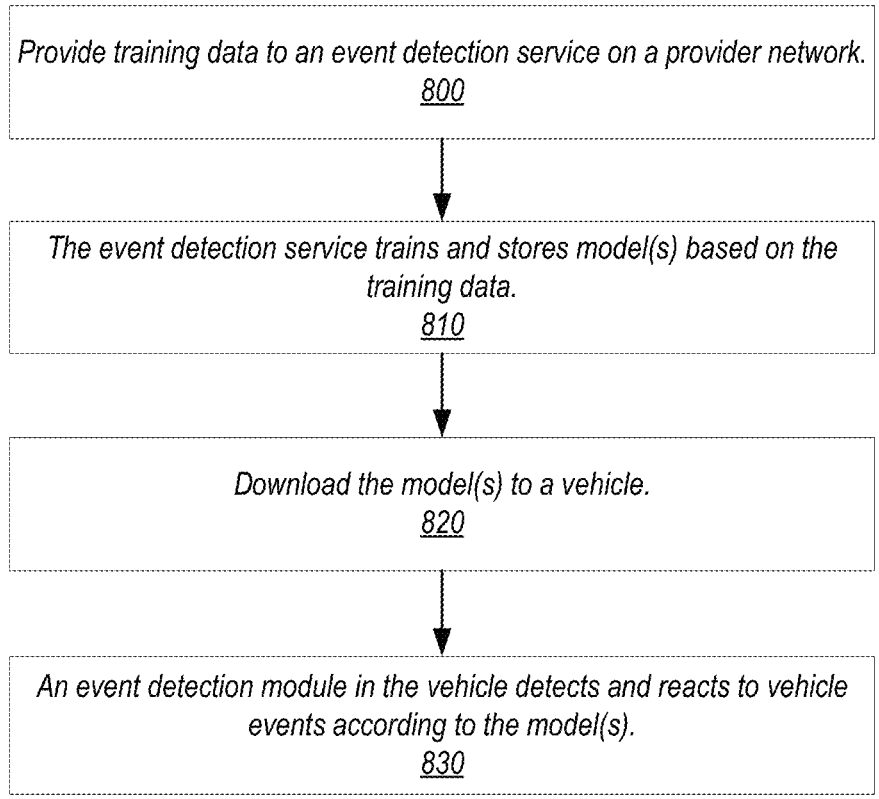
FIG. 8 is a high-level flowchart of a method for locally detecting and responding to events related to a vehicle based on models generated by the event detection service, according to some embodiments.

FIG. 8 is a high-level flowchart of a method for locally detecting and responding to events related to a vehicle based on models generated by the event detection service, according to some embodiments. As indicated at 800, training data is provided to an event detection service on a provider network. As indicated at 810, the event detection service trains and stores one or more models based on the training data. As indicated at 820, one or more of the model(s) may be downloaded to a vehicle. As indicated at 830, an event detection module in the vehicle detects and reacts to vehicle events according to the model(s), for example using a supervised learning technique. In some embodiments, the event detection module in a vehicle may detect and respond to events related to the vehicle based on the downloaded models only under certain conditions, for example when a wireless connection to the provider network is unavailable or unreliable, or in situations where a more immediate response than can be provided by the network-based service is needed, such as collision avoidance. In some embodiments, models generated by the event detection service using unsupervised learning techniques may be downloaded to vehicles; event detection modules in the vehicles may then detect and react to events according to the model(s) using unsupervised learning techniques.

Figure 9:
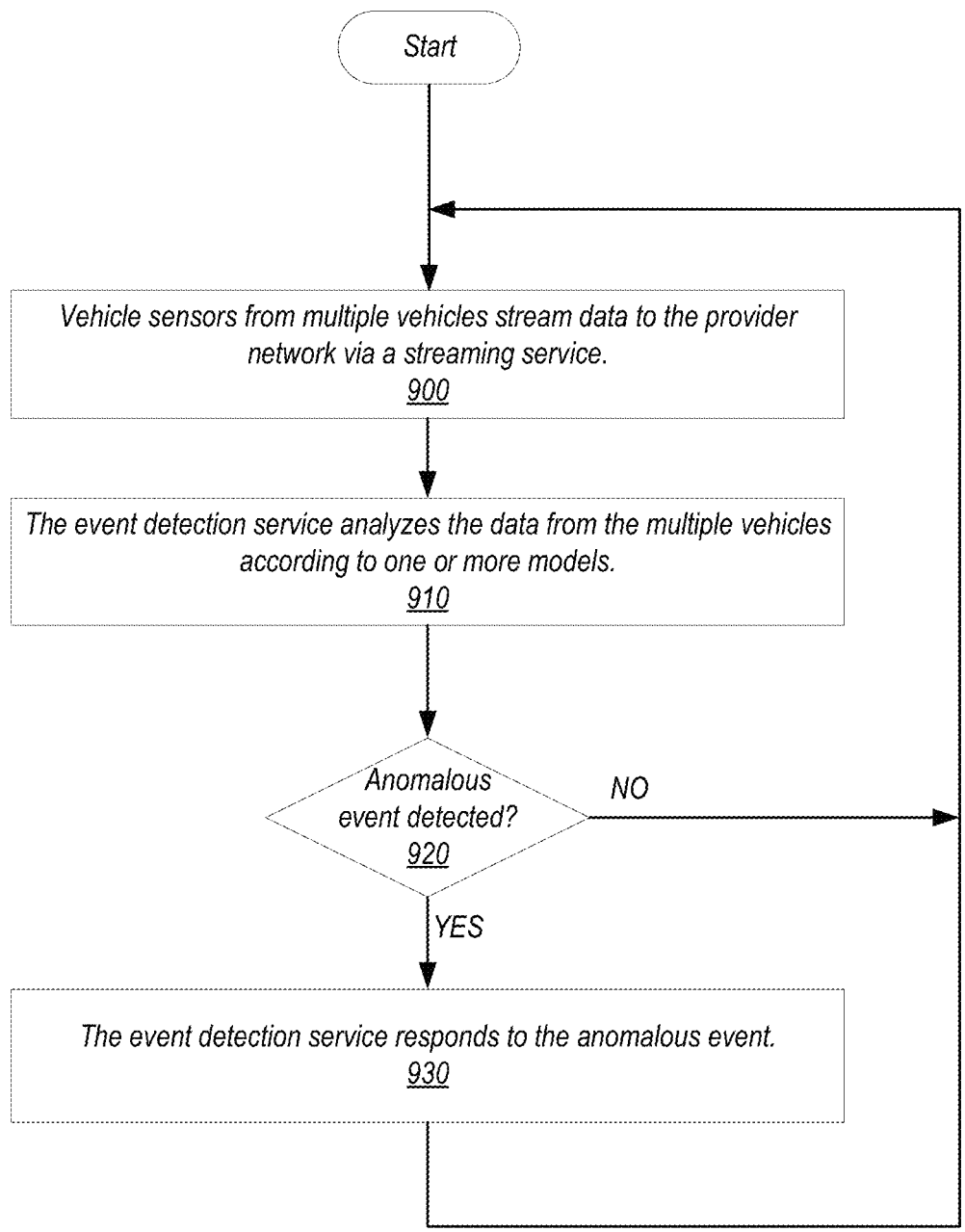
FIG. 9 is a high-level flowchart of a method for detecting and responding to events related to vehicles using unsupervised learning, according to some embodiments.

FIG. 9 is a high-level flowchart of a method for detecting and responding to events related to vehicles using unsupervised learning, according to some embodiments. Metadata included in the streams of sensor data from multiple vehicles, for example time and location information, may be used to correlate sensor data from two or more vehicles. The correlated sensor data from two or more vehicles may, for example, be analyzed to detect environmental anomalies such as potholes, unusually heavy traffic, etc. As indicated at 900, vehicle sensors from multiple vehicles stream sensor data to the provider network via a streaming service. As indicated at 910, the event detection service analyzes the data from the multiple vehicles according to one or more models using an unsupervised learning technique. The analysis may detect an anomalous event (e.g., a pothole, road obstruction, heavy traffic, etc.) based on the analysis. As indicated at 920, if an anomalous event is detected, then the event detection service responds to the anomalous event as indicated at 930, for example using a method similar to the method illustrated in FIG. 6B. As indicated by the arrows returning from elements 920 and 930 to element 900, the event detection system may continuously monitor sensor data from the vehicles to detect anomalous events. Using an unsupervised learning technique, the system learns more about the environment and the behavior of the vehicles and passengers in the vehicles over time, and may thus be better able to recognize known or common events and behaviors and to infer or predict anomalous events and behaviors over time.

Figure 10:
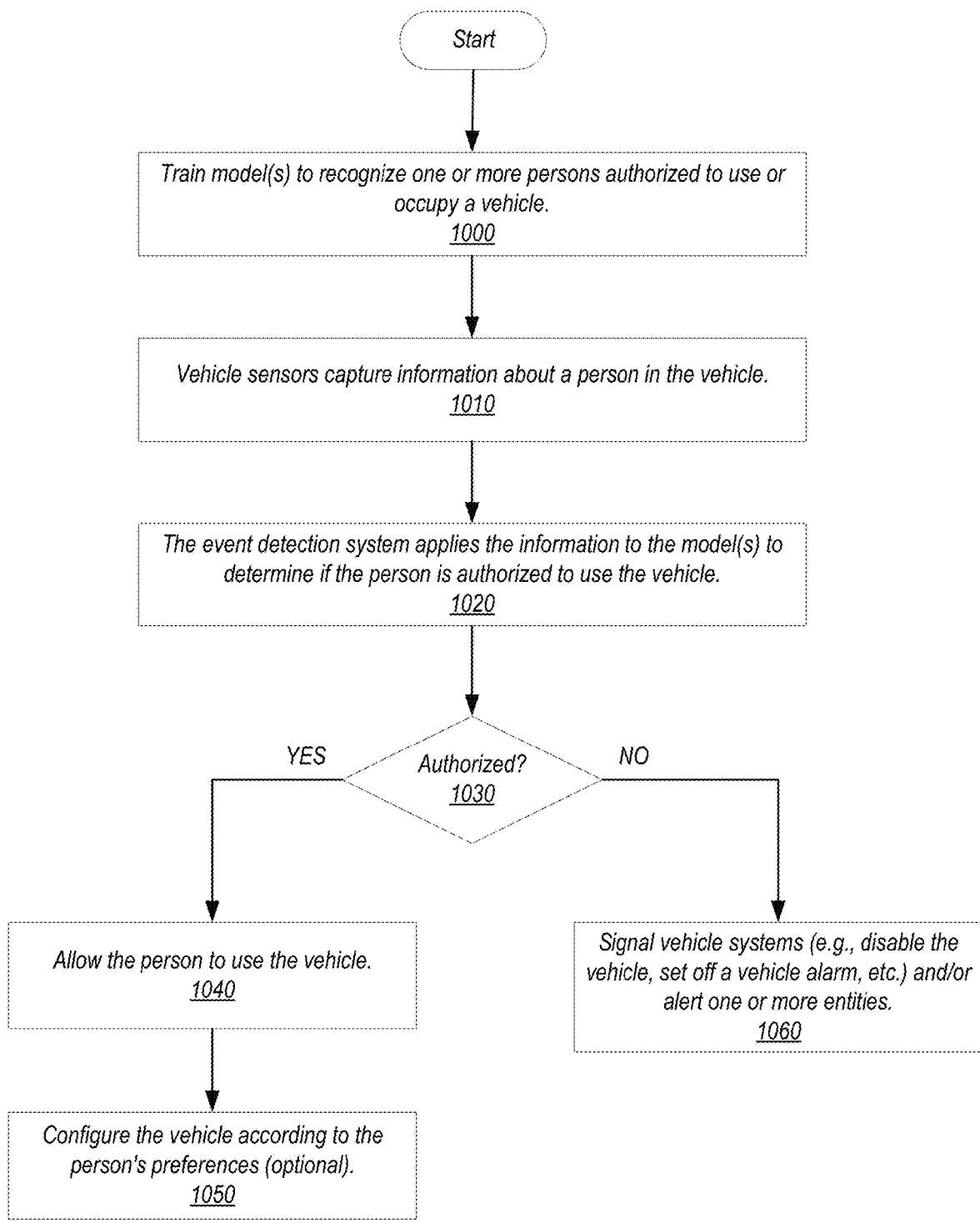
FIG. 10 is a high-level flowchart of a method for detecting and responding to authorized and unauthorized persons in a vehicle, according to some embodiments.

FIG. 10 is a high-level flowchart of a method for detecting and responding to authorized and unauthorized persons in a vehicle, according to some embodiments. As indicated at 1000, one or more models may be trained to recognize one or more persons that are authorized to use or occupy a vehicle using a supervised learning technique. For example, one or more models may be trained to recognize the faces of one or more persons authorized to use or occupy a vehicle using a supervised learning technique. For example, a customer may access the event detection service through a GUI provided by an event detection module in their vehicle to configure their account. The GUI may provide an "add driver" UI element that, when selected, takes video or photo(s) of a person sitting in the driver's seat via internal camera(s). After capturing the image(s) of the person, the image(s) may be used as training data for a model that is used to detect allowed driver(s) of the vehicle. In some embodiments, a customer may access the event detection service via other methods, for example via a mobile phone application for the service or via a web interface to the service, to upload image(s) of persons to be added as allowed drivers.

As indicated at 1010, vehicle sensors capture information about a person in the vehicle. For example, a vehicle video camera may detect and capture video of a person in the vehicle. As indicated at 1020, the event detection system applies the information (e.g., captured video) to the trained model(s) to determine if the person is authorized to use the vehicle. At 1030, if the person is authorized to use the vehicle, then the event detection system allows the person to use the vehicle as indicated at 1040. In some embodiments, as indicated at 1050, the event detection system may cause the vehicle to be configured according to the authorized person's preferences, for example by adjusting the seat, steering wheel, mirrors, pedals, audio system, and/or climate control system according to the person's preferences.

At 1030, if the person is not authorized to use the vehicle, then the event detection system may take one or more actions as indicated at 1060. For example, the event detection system may signal one or more vehicle systems to disable the vehicle, set off a vehicle alarm, etc. As another example, the event detection system may alert one or more entities, for example the vehicle's owner and/or the police, that an unauthorized person is accessing the vehicle.

In some embodiments, instead of or in addition to using facial recognition applied to captured video to detect authorized and unauthorized persons in a vehicle, machine learning techniques may be applied to other features of persons (e.g., body features, voice, fingerprints, weight, etc.) and/or to preferences of persons (e.g., settings of vehicle systems (seat position, steering wheel position, mirror settings, climate and audio settings, etc.)) to train models for recognizing and identifying those persons.

In some embodiments, instead of or in addition to the above methods for detecting authorized and unauthorized persons in a vehicle, information about authorized persons obtained from one or more other sources (e.g., other services on the provided network) may be used to detect unauthorized proximity to or access of a vehicle. The obtained information may indicate whether or not an authorized person is at the vehicle's location when someone is detected at or in the vehicle. For example, information obtained from another service on the provider network (e.g., credit or debit card usage information, or information that indicates the person is currently at home) may indicate that the authorized person(s) for a vehicle is at another location and not currently at the vehicle's location when someone is at or in the vehicle. In some embodiments, if a person at or in a vehicle is identified as being an authorized user of the vehicle, that information may be shared with other services which may then use the information, for example to detect potentially unauthorized use of debit or credit cards of that person.

Figure 11:
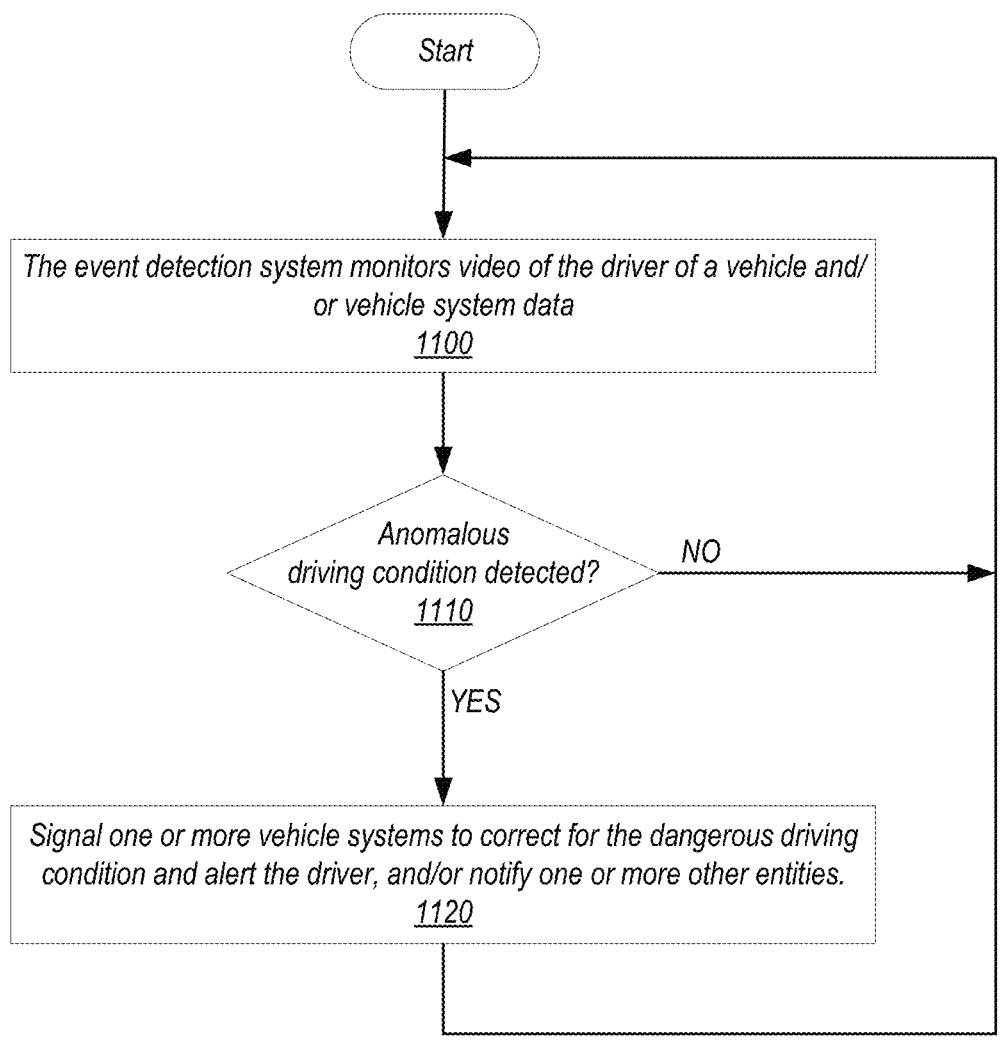
FIG. 11 is a high-level flowchart of a method for monitoring a vehicle to detect anomalous conditions, according to some embodiments.

FIG. 11 is a high-level flowchart of a method for monitoring a vehicle, and/or a driver of a vehicle, to detect anomalous driving conditions, according to some embodiments. As indicated at 1100, the event detection system monitors video of the driver of a vehicle and/or vehicle system data. The system may detect an anomalous driving condition. For example, analysis of video of the driver by the system may detect that the driver is drowsy, falling asleep, distracted, or otherwise behaving abnormally by applying the streamed video to a model trained using an unsupervised training technique with video of the driver's normal behavior. As another example, analysis of vehicle system sensor data may indicate that the vehicle is driving erratically, for example swerving, following too close, going to slow or too fast, etc. As another example, analysis of vehicle system sensor data may indicate an anomaly in vehicle operating conditions, for example overheating of the brakes or the engine, low tire pressure, etc. At 1110, if an anomalous driving condition is detected, then the event detection system may take one or more appropriate actions as indicated at 1120. In some embodiments, the event detection system may signal one or more vehicle systems to correct for a detected anomalous driving condition (e.g., detected drowsiness) and alert the driver. For example, the event detection system may signal one or more vehicle systems (e.g., the climate control system, audio system, brakes, throttle, steering, etc.) to activate or modulate upon detecting that a person currently driving the vehicle is drowsy, nodding off, etc. based on analysis of video images of the person. As another example, the event detection system may notify one or more other entities such as an event detection service customer associated with the vehicle, the police, or an EMT service of the anomalous driving condition.

Figure 12:
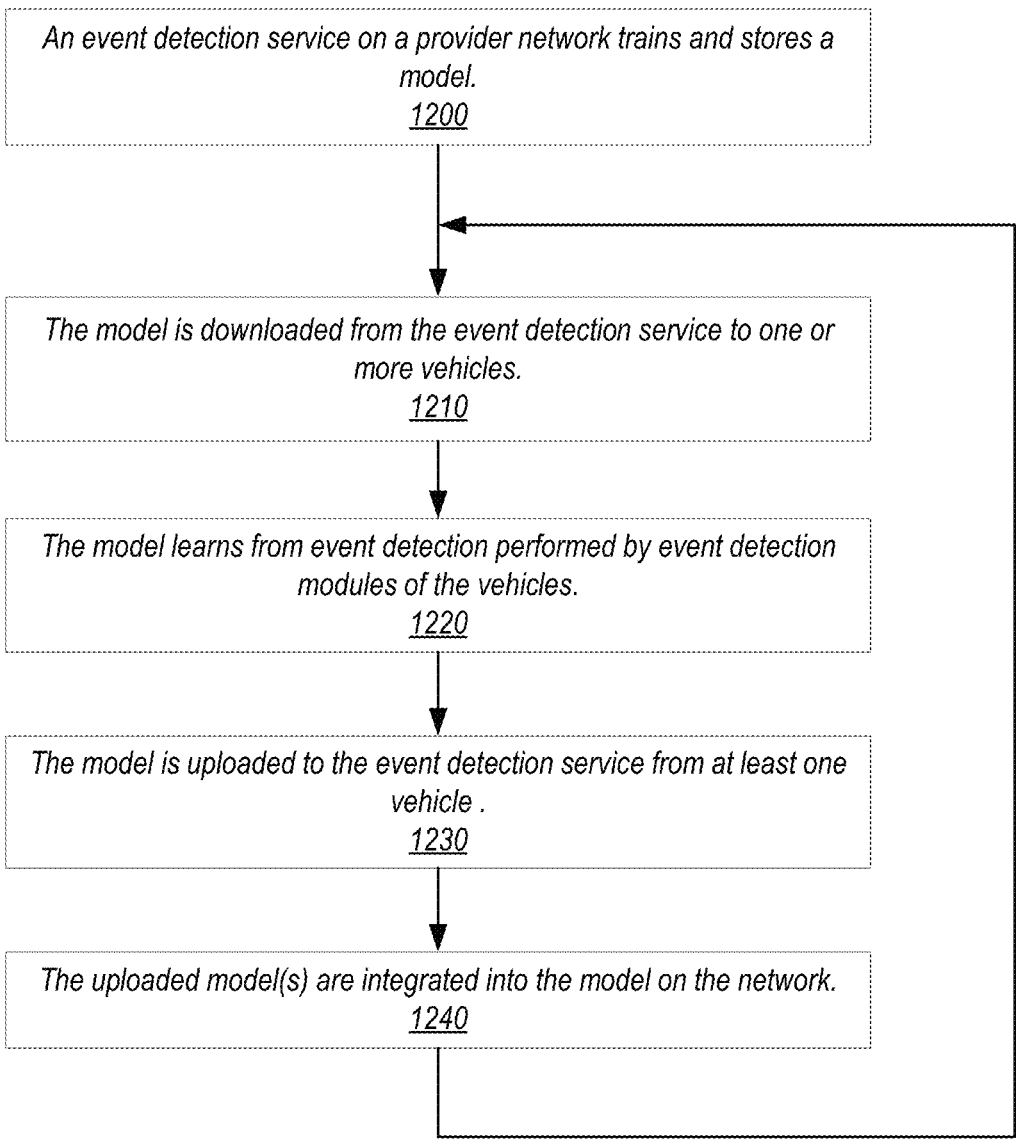
FIG. 12 is a flowchart of a method for integrating models from vehicles into the network-based models to improve the performance of the models, according to some embodiments.

FIG. 12 is a flowchart of a method for integrating models from vehicles into the network-based models to improve the performance of the models, according to some embodiments. As indicated at 1200, an event detection service on a provider network trains and stores a model. As indicated at 1210, the model is downloaded from the event detection service to one or more vehicles. As indicated at 1220, the model learns from event detect performed by event detection modules of the vehicles. As indicated at 1230, the model is uploaded to the event detection service from at least one vehicle. As indicated at 1240, the uploaded model(s) are integrated into the model on the network. As shown by the arrow returning from 1240 to 1210, the integrated models can then be downloaded to one or more vehicles, further trained, uploaded to the network and integrated into the model on the network, and so on. Thus, the models used in the event detection system may be improved over time based on information collected from multiple vehicles operating in real environments.

Example Use Cases

In addition to the example use cases described above (detecting unauthorized drivers, detecting drowsy drivers, etc.), the following describes several non-limiting use cases for embodiments of the event detection system as described herein.

In some embodiments, sensor data from external sensors (e.g., external video cameras, depth sensors, etc.) of two or more vehicles in an area or location may be streamed to the network-based event detection service, correlated and combined, and used in constructing a full, 3D representation or model of the location. Feature detection may then be performed on this model using a machine learning technique.

Since vehicles are mobile, in some embodiments, the event detection system may direct one or more vehicles to a particular location (e.g., by providing instructions to the driver, or by sending instructions to an autonomous vehicle). Sensor data from external sensors of the vehicles may be streamed to the network-based event detection service, correlated and combined, and used in constructing a full, 3D representation or model of the location. Feature detection may then be performed on this model using a machine learning technique. This may, for example, be useful in emergency situations to provide valuable information about the situation to responders or others affected by the situation.

In some embodiments, sensor data from other sources (e.g., from cameras mounted on street lights or buildings, drone cameras, etc.) may be streamed to the network-based event detection service. This data may be correlated and combined with streamed sensor data from one or more vehicles in the area, and used in constructing a more complete 3D representation or model of the location than is achievable using the data from just one of the sources.

In some embodiments, sensor data from a vehicle may be used to detect that the vehicle is moving when it should be stationary. Upon detecting an unexpectedly moving vehicle, a customer associated with the vehicle and/or an authority (e.g., the police or a security guard) may be notified, for example via a text message or telephone call.

Some vehicles may include external video cameras that can capture views on one, two, or all sides of the vehicle. In some embodiments, video data captured by external camera(s) of a parked vehicle may be streamed to the network-based event detection service (or, alternatively, provided to the vehicle's event detection module) and analyzed to detect anomalous or suspicious activity around the vehicle. Upon detecting anomalous or suspicious activity around the vehicle, a customer associated with the vehicle and/or an authority (e.g., the police or a security guard) may be notified, for example via a text message or telephone call.

Some vehicles may include internal video cameras that can capture views of the interior of the vehicle, and may also have other internal sensors such as thermal sensors, motion sensors, accelerometers, weight or pressure sensors in the seats, etc. In some embodiments, video data captured by internal senor(s) of a parked vehicle may be streamed to the network-based event detection service (or, alternatively, provided to the vehicle's event detection module) and analyzed to detect anomalous or suspicious activity inside the vehicle, for example a break-in, or a child or pet left in the vehicle. Upon detecting anomalous or suspicious activity inside the vehicle, a customer associated with the vehicle and/or an authority (e.g., the police or a security guard) may be notified, for example via a text message or telephone call.

Example Provider Network Environment

This section describes example provider network environments in which embodiments of the methods and apparatus described in reference to FIGS. 1 through 12 may be implemented. However, these example provider network environments are not intended to be limiting.

Figure 13:
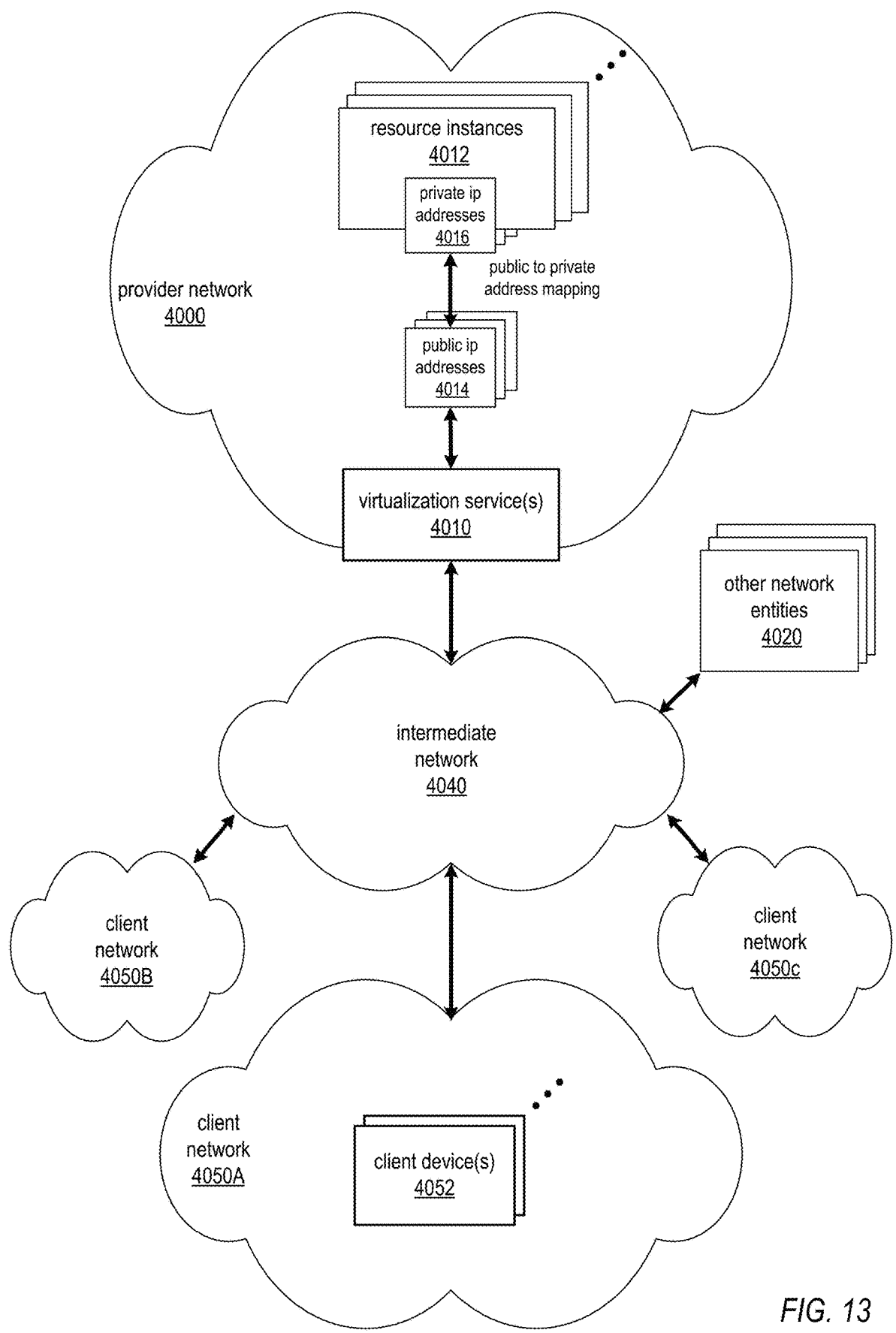
FIG. 13 illustrates an example provider network environment, according to some embodiments.

FIG. 13 illustrates an example provider network environment, according to some embodiments. A provider network 4000 may provide resource virtualization to clients via one or more virtualization services 4010 that allow clients to purchase, rent, or otherwise obtain instances 4012 of virtualized resources, including but not limited to computation and storage resources, implemented on devices within the provider network or networks in one or more data centers. Private IP addresses 4016 may be associated with the resource instances 4012; the private IP addresses are the internal network addresses of the resource instances 4012 on the provider network 4000. In some embodiments, the provider network 4000 may also provide public IP addresses 4014 and/or public IP address ranges (e.g., Internet Protocol version 4 (IPv4) or Internet Protocol version 6 (IPv6) addresses) that clients may obtain from the provider 4000.

Conventionally, the provider network 4000, via the virtualization services 4010, may allow a client of the service provider (e.g., a client that operates client network 4050A) to dynamically associate at least some public IP addresses 4014 assigned or allocated to the client with particular resource instances 4012 assigned to the client. The provider network 4000 may also allow the client to remap a public IP address 4014, previously mapped to one virtualized computing resource instance 4012 allocated to the client, to another virtualized computing resource instance 4012 that is also allocated to the client. Using the virtualized computing resource instances 4012 and public IP addresses 4014 provided by the service provider, a client of the service provider such as the operator of client network 4050A may, for example, implement client-specific applications and present the client's applications on an intermediate network 4040, such as the Internet. Other network entities 4020 on the intermediate network 4040 may then generate traffic to a destination public IP address 4014 published by the client network 4050A; the traffic is routed to the service provider data center, and at the data center is routed, via a network substrate, to the private IP address 4016 of the virtualized computing resource instance 4012 currently mapped to the destination public IP address 4014. Similarly, response traffic from the virtualized computing resource instance 4012 may be routed via the network substrate back onto the intermediate network 4040 to the source entity 4020.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include networking devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a private IP address of a resource instance is the default launch configuration for all resource instance types.

At least some public IP addresses may be allocated to or obtained by clients of the provider network 4000; a client may then assign their allocated public IP addresses to particular resource instances allocated to the client. These public IP addresses may be referred to as client public IP addresses, or simply client IP addresses. Instead of being assigned by the provider network 4000 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 14:
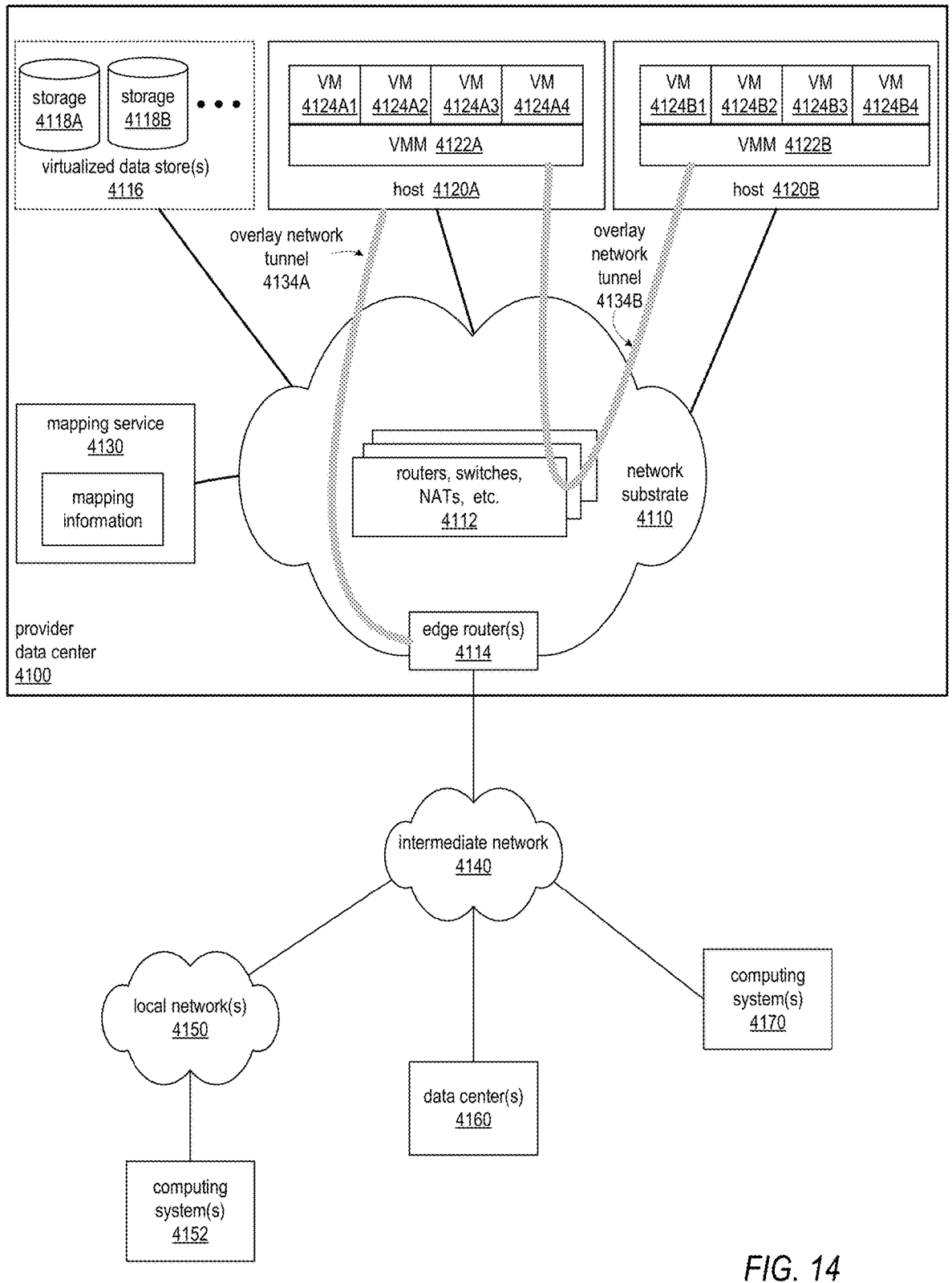
FIG. 14 illustrates an example data center that implements an overlay network on a network substrate using IP tunneling technology, according to some embodiments.

FIG. 14 illustrates an example data center that implements an overlay network on a network substrate using IP tunneling technology, according to some embodiments. A provider data center 4100 may include a network substrate that includes networking devices 4112 such as routers, switches, network address translators (NATs), and so on. Some embodiments may employ an Internet Protocol (IP) tunneling technology to provide an overlay network via which encapsulated packets may be passed through network substrate 4110 using tunnels. The IP tunneling technology may provide a mapping and encapsulating system for creating an overlay network on a network (e.g., a local network in data center 4100 of FIG. 14) and may provide a separate namespace for the overlay layer (the public IP addresses) and the network substrate 4110 layer (the private IP addresses). Packets in the overlay layer may be checked against a mapping directory (e.g., provided by mapping service 4130) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 4130) that knows where the IP overlay addresses are.

In some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 14, an example overlay network tunnel 4134A from a virtual machine (VM) 4124A on host 4120A to a device on the intermediate network 4150 and an example overlay network tunnel 4134B between a VM 4124B on host 4120B and a VM 4124C on host 4120C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 14, at least some networks in which embodiments may be implemented may include hardware virtualization technology that enables multiple operating systems to run concurrently on a host computer (e.g., hosts 4120A and 4120B of FIG. 14), i.e. as virtual machines (VMs) 4124 on the hosts 4120. The VMs 4124 may, for example, be executed in slots on the hosts 4120 that are rented or leased to clients of a network provider. A hypervisor, or virtual machine monitor (VMM) 4122, on a host 4120 presents the VMs 4124 on the host with a virtual platform and monitors the execution of the VMs 4124. Each VM 4124 may be provided with one or more private IP addresses; the VMM 4122 on a host 4120 may be aware of the private IP addresses of the VMs 4124 on the host. A mapping service 4130 may be aware of all network IP prefixes and the IP addresses of routers or other devices serving IP addresses on the local network. This includes the IP addresses of the VMMs 4122 serving multiple VMs 4124. The mapping service 4130 may be centralized, for example on a server system, or alternatively may be distributed among two or more server systems or other devices on the network. A network may, for example, use the mapping service technology and IP tunneling technology to, for example, route data packets between VMs 4124 on different hosts 4120 within the data center 4100 network; note that an interior gateway protocol (IGP) may be used to exchange routing information within such a local network.

In addition, a network such as the provider data center 4100 network (which is sometimes referred to as an autonomous system (AS)) may use the mapping service technology, IP tunneling technology, and routing service technology to route packets from the VMs 4124 to Internet destinations, and from Internet sources to the VMs 4124. Note that an external gateway protocol (EGP) or border gateway protocol (BGP) is typically used for Internet routing between sources and destinations on the Internet. FIG. 14 shows an example provider data center 4100 implementing a network that provides resource virtualization technology and that provides full Internet access via edge router(s) 4114 that connect to Internet transit providers, according to some embodiments. The provider data center 4100 may, for example, provide clients the ability to implement virtual computing systems (VMs 4124) via a hardware virtualization service and the ability to implement virtualized data stores 4116 on storage resources 4118 via a storage virtualization service.

The data center 4100 network may implement IP tunneling technology, mapping service technology, and a routing service technology to route traffic to and from virtualized resources, for example to route packets from the VMs 4124 on hosts 4120 in data center 4100 to Internet destinations, and from Internet sources to the VMs 4124. Internet sources and destinations may, for example, include computing systems 4170 connected to the intermediate network 4140 and computing systems 4152 connected to local networks 4150 that connect to the intermediate network 4140 (e.g., via edge router(s) 4114 that connect the network 4150 to Internet transit providers). The provider data center 4100 network may also route packets between resources in data center 4100, for example from a VM 4124 on a host 4120 in data center 4100 to other VMs 4124 on the same host or on other hosts 4120 in data center 4100.

A service provider that provides data center 4100 may also provide additional data center(s) 4160 that include hardware virtualization technology similar to data center 4100 and that may also be connected to intermediate network 4140. Packets may be forwarded from data center 4100 to other data centers 4160, for example from a VM 4124 on a host 4120 in data center 4100 to another VM on another host in another, similar data center 4160, and vice versa.

While the above describes hardware virtualization technology that enables multiple operating systems to run concurrently on host computers as virtual machines (VMs) on the hosts, where the VMs may be instantiated on slots on hosts that are rented or leased to clients of the network provider, the hardware virtualization technology may also be used to provide other computing resources, for example storage resources 4118, as virtualized resources to clients of a network provider in a similar manner.

In some embodiments, instead of or in addition to providing hardware virtualization technology that enables multiple operating systems to run concurrently on host computers as virtual machines (VMs) on the hosts, container technology may be leveraged to provide containers to clients of the network provider. Container technology is a virtualization technology that allows applications to be developed as containers that can be deployed to and executed in container-based virtualization environments provided by container platforms on host machines, for example on one or more hosts 4120 in a provider data center 4100. A container is a stand-alone executable package that executes in a container-based virtualization environment on a host machine and that includes resources needed to execute an application in the container-based virtualization environment: e.g., code, runtime, system tools, system libraries, and settings. A container platform virtualizes an operating system (OS) in order for multiple containers to run on a single OS instance. A primary difference between containers and VMs is that containers provide a way to virtualize an OS in order for multiple workloads to run on a single OS instance, whereas with VMs, the hardware is virtualized to run multiple OS instances.

Figure 15:
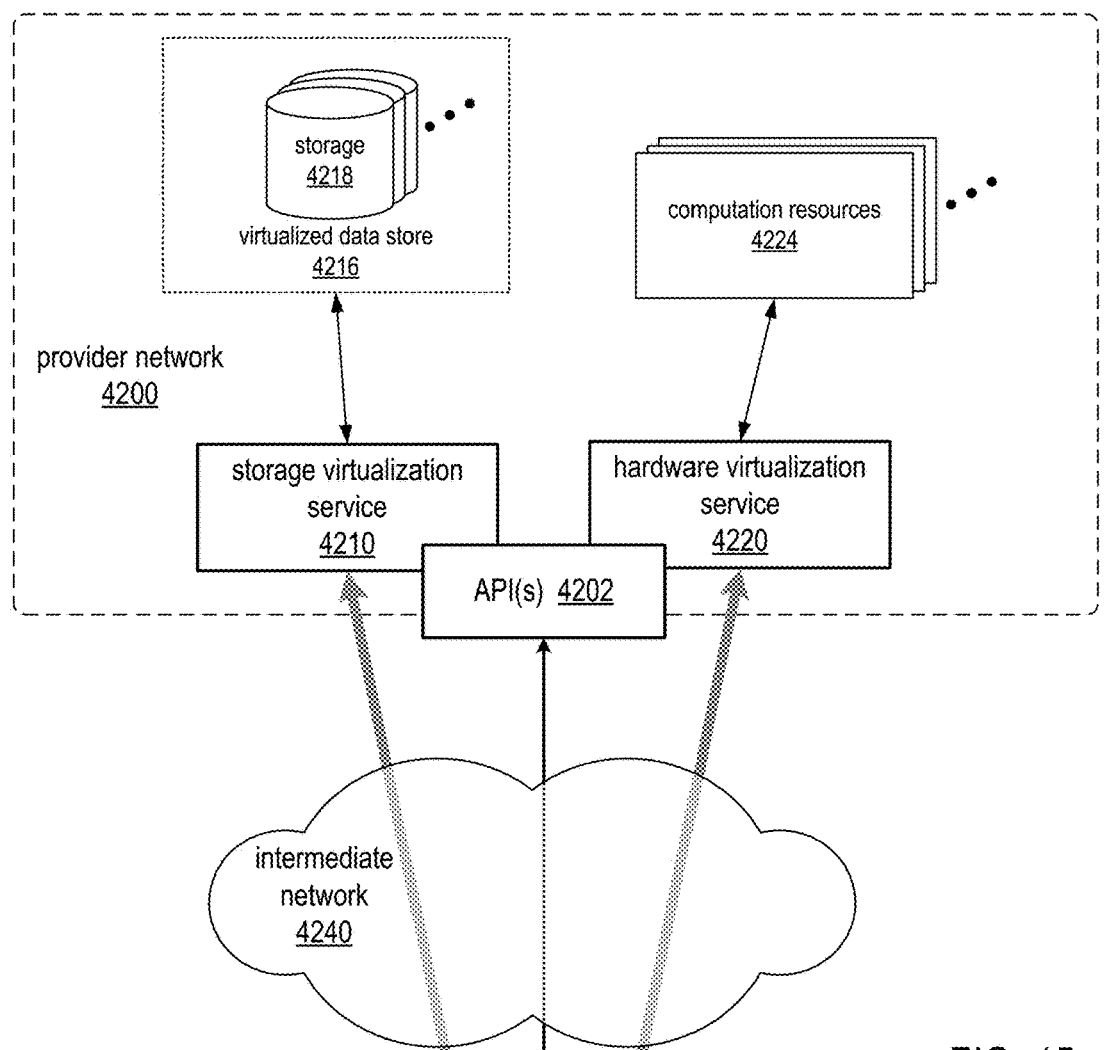
FIG. 15 is a block diagram of an example provider network that provides a storage virtualization service and a hardware virtualization service to clients, according to some embodiments.
Figure 15:
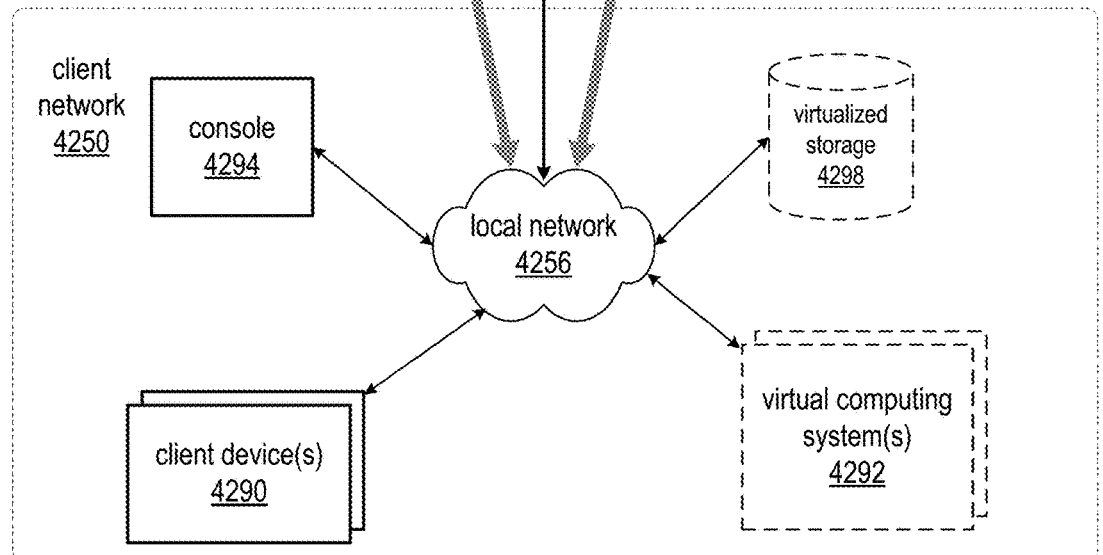

FIG. 15 is a block diagram of an example provider network that provides a storage virtualization service and a hardware virtualization service to clients, according to some embodiments. Hardware virtualization service 4220 provides multiple computation resources 4224 (e.g., VMs) to clients. The computation resources 4224 may, for example, be rented or leased to clients of the provider network 4200 (e.g., to a client that implements client network 4250). Each computation resource 4224 may be provided with one or more private IP addresses. Provider network 4200 may be configured to route packets from the private IP addresses of the computation resources 4224 to public Internet destinations, and from public Internet sources to the computation resources 4224.

Provider network 4200 may provide a client network 4250, for example coupled to intermediate network 4240 via local network 4256, the ability to implement virtual computing systems 4292 via hardware virtualization service 4220 coupled to intermediate network 4240 and to provider network 4200. In some embodiments, hardware virtualization service 4220 may provide one or more APIs 4202, for example a web services interface, via which a client network 4250 may access functionality provided by the hardware virtualization service 4220, for example via a console 4294. In some embodiments, at the provider network 4200, each virtual computing system 4292 at client network 4250 may correspond to a computation resource 4224 that is leased, rented, or otherwise provided to client network 4250.

From an instance of a virtual computing system 4292 and/or another client device 4290 or console 4294, the client may access the functionality of storage virtualization service 4210, for example via one or more APIs 4202, to access data from and store data to a virtual data store 4216 provided by the provider network 4200. In some embodiments, a virtualized data store gateway (not shown) may be provided at the client network 4250 that may locally cache at least some data, for example frequently accessed or critical data, and that may communicate with virtualized data store service 4210 via one or more communications channels to upload new or modified data from a local cache so that the primary store of data (virtualized data store 4216) is maintained. In some embodiments, a user, via a virtual computing system 4292 and/or on another client device 4290, may mount and access virtual data store 4216 volumes, which appear to the user as local virtualized storage 4298.

While not shown in FIG. 15, the virtualization service(s) may also be accessed from resource instances within the provider network 4200 via API(s) 4202. For example, a client, appliance service provider, or other entity may access a virtualization service from within a respective virtual network on the provider network 4200 via an API 4202 to request allocation of one or more resource instances within the virtual network or within another virtual network.

Figure 16:
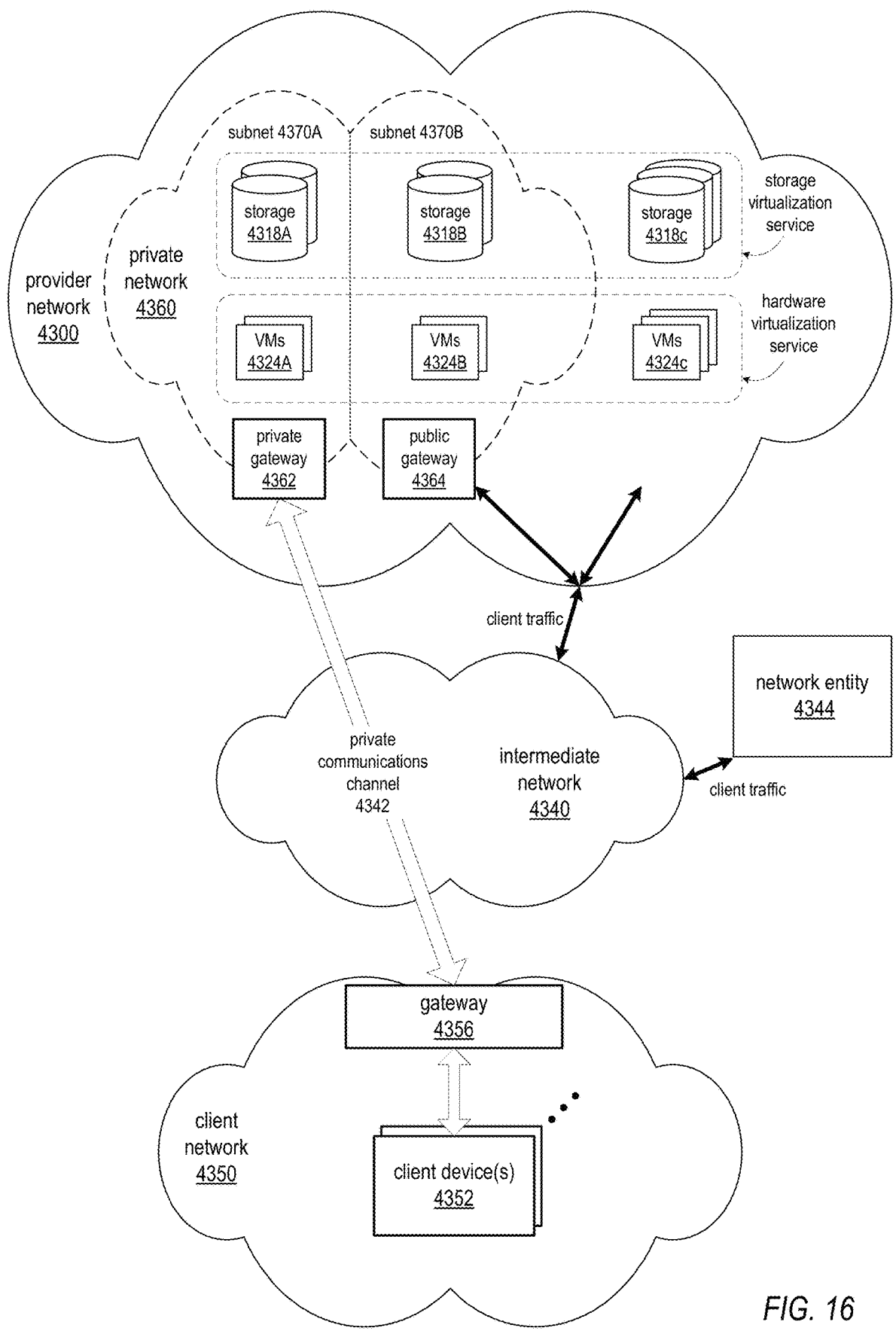
FIG. 16 illustrates an example provider network that provides virtual networks to at least some clients, according to some embodiments.

FIG. 16 illustrates an example provider network that provides virtual networks on the provider network to at least some clients, according to some embodiments. A client's virtual network 4360 on a provider network 4300, for example, enables a client to connect their existing infrastructure (e.g., devices 4352) on client network 4350 to a set of logically isolated resource instances (e.g., VMs 4324A and 4324B and storage 4318A and 4318B), and to extend management capabilities such as security services, firewalls, and intrusion detection systems to include their resource instances.

A client's virtual network 4360 may be connected to a client network 4350 via a private communications channel 4342. A private communications channel 4342 may, for example, be a tunnel implemented according to a network tunneling technology or some other technology over an intermediate network 4340. The intermediate network may, for example, be a shared network or a public network such as the Internet. Alternatively, a private communications channel 4342 may be implemented over a direct, dedicated connection between virtual network 4360 and client network 4350.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a client network.

To establish a virtual network 4360 for a client on provider network 4300, one or more resource instances (e.g., VMs 4324A and 4324B and storage 4318A and 4318B) may be allocated to the virtual network 4360. Note that other resource instances (e.g., storage 4318C and VMs 4324C) may remain available on the provider network 4300 for other client usage. A range of public IP addresses may also be allocated to the virtual network 4360. In addition, one or more networking devices (routers, switches, etc.) of the provider network 4300 may be allocated to the virtual network 4360. A private communications channel 4342 may be established between a private gateway 4362 at virtual network 4360 and a gateway 4356 at client network 4350.

In some embodiments, in addition to, or instead of, a private gateway 4362, virtual network 4360 may include a public gateway 4364 that enables resources within virtual network 4360 to communicate directly with entities (e.g., network entity 4344) via intermediate network 4340, and vice versa, instead of or in addition to via private communications channel 4342.

Virtual network 4360 may be, but is not necessarily, subdivided into two or more subnetworks, or subnets, 4370. For example, in implementations that include both a private gateway 4362 and a public gateway 4364, a virtual network 4360 may be subdivided into a subnet 4370A that includes resources (VMs 4324A and storage 4318A, in this example) reachable through private gateway 4362, and a subnet 4370B that includes resources (VMs 4324B and storage 4318B, in this example) reachable through public gateway 4364.

The client may assign particular client public IP addresses to particular resource instances in virtual network 4360. A network entity 4344 on intermediate network 4340 may then send traffic to a public IP address published by the client; the traffic is routed, by the provider network 4300, to the associated resource instance. Return traffic from the resource instance is routed, by the provider network 4300, back to the network entity 4344 over intermediate network 4340. Note that routing traffic between a resource instance and a network entity 4344 may require network address translation to translate between the public IP address and the private IP address of the resource instance.

Some embodiments may allow a client to remap public IP addresses in a client's virtual network 4360 as illustrated in FIG. 16 to devices on the client's external network 4350. When a packet is received (e.g., from network entity 4344), the network 4300 may determine that the destination IP address indicated by the packet has been remapped to an endpoint on external network 4350 and handle routing of the packet to the respective endpoint, either via private communications channel 4342 or via the intermediate network 4340. Response traffic may be routed from the endpoint to the network entity 4344 through the provider network 4300, or alternatively may be directly routed to the network entity 4344 by the client network 4350. From the perspective of the network entity 4344, it appears as if the network entity 4344 is communicating with the public IP address of the client on the provider network 4300. However, the network entity 4344 has actually communicated with the endpoint on client network 4350.

While FIG. 16 shows network entity 4344 on intermediate network 4340 and external to provider network 4300, a network entity may be an entity on provider network 4300. For example, one of the resource instances provided by provider network 4300 may be a network entity that sends traffic to a public IP address published by the client.

Illustrative System

Figure 17:
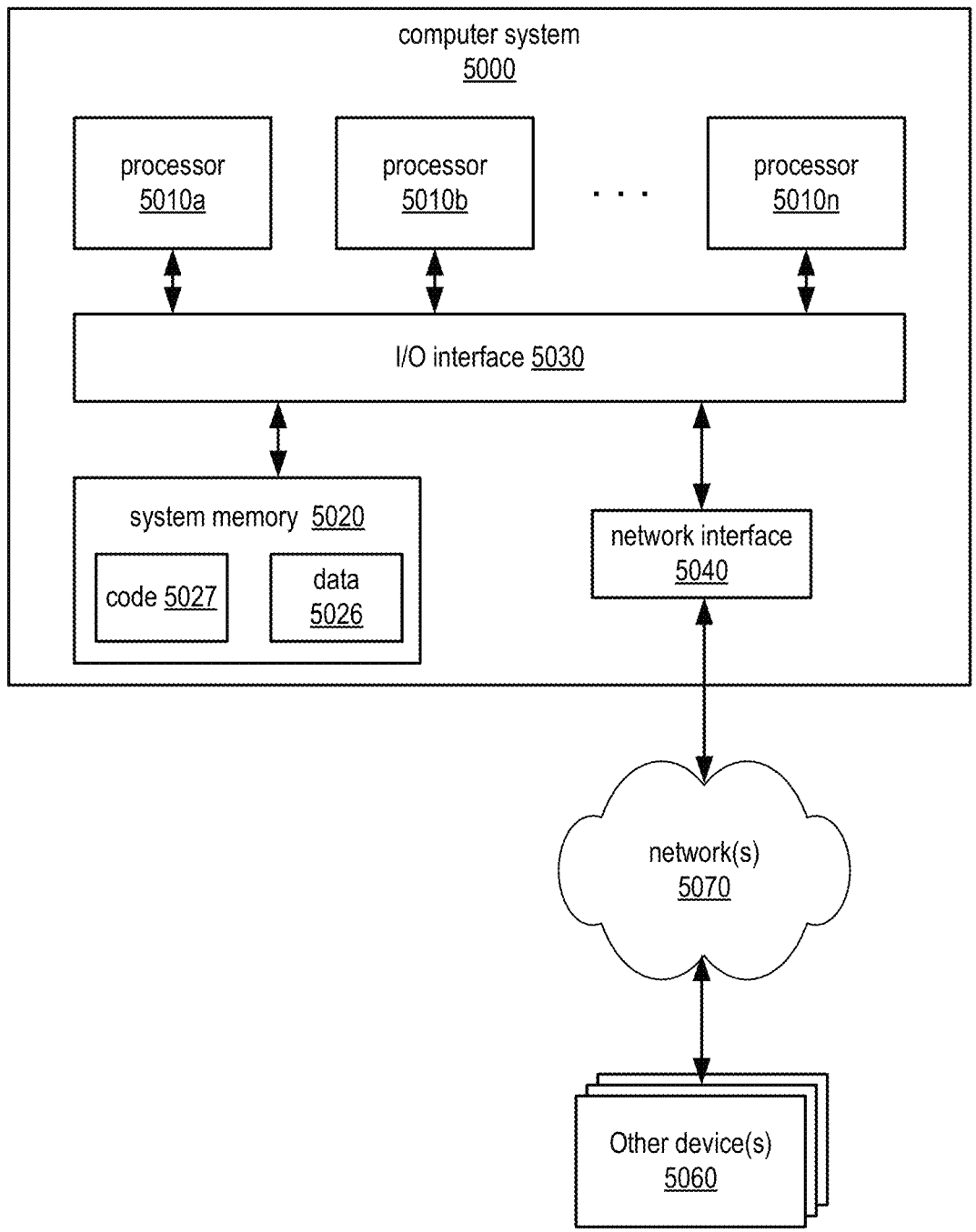
FIG. 17 is a block diagram illustrating an example computer system that may be used in some embodiments.

In some embodiments, a system that implements a portion or all of the methods and apparatus for detecting and responding to events in vehicles as described herein may include a general-purpose computer system that includes or is configured to access one or more computer-accessible media, such as computer system 5000 illustrated in FIG. 17. In the illustrated embodiment, computer system 5000 includes one or more processors 5010 coupled to a system memory 5020 via an input/output (I/O) interface 5030. Computer system 5000 further includes a network interface 5040 coupled to I/O interface 5030. While FIG. 17 shows computer system 5000 as a single computing device, in various embodiments a computer system 5000 may include one computing device or any number of computing devices configured to work together as a single computer system 5000.

In various embodiments, computer system 5000 may be a uniprocessor system including one processor 5010, or a multiprocessor system including several processors 5010 (e.g., two, four, eight, or another suitable number). Processors 5010 may be any suitable processors capable of executing instructions. For example, in various embodiments, processors 5010 may be general-purpose or embedded processors implementing any of a variety of instruction set architectures (ISAs), such as the x86, PowerPC, SPARC, or MIPS ISAs, or any other suitable ISA. In multiprocessor systems, each of processors 5010 may commonly, but not necessarily, implement the same ISA.

System memory 5020 may be configured to store instructions and data accessible by processor(s) 5010. In various embodiments, system memory 5020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for providing client-defined rules for clients' resources in provider network environments, are shown stored within system memory 5020 as code 5025 and data 5026.

In one embodiment, I/O interface 5030 may be configured to coordinate I/O traffic between processor 5010, system memory 5020, and any peripheral devices in the device, including network interface 5040 or other peripheral interfaces. In some embodiments, I/O interface 5030 may perform any necessary protocol, timing or other data transformations to convert data signals from one component (e.g., system memory 5020) into a format suitable for use by another component (e.g., processor 5010). In some embodiments, I/O interface 5030 may include support for devices attached through various types of peripheral buses, such as a variant of the Peripheral Component Interconnect (PCI) bus standard or the Universal Serial Bus (USB) standard, for example. In some embodiments, the function of I/O interface 5030 may be split into two or more separate components, such as a north bridge and a south bridge, for example. Also, in some embodiments some or all of the functionality of I/O interface 5030, such as an interface to system memory 5020, may be incorporated directly into processor 5010.

Network interface 5040 may be configured to allow data to be exchanged between computer system 5000 and other devices 5060 attached to a network or networks 5050, such as other computer systems or devices as illustrated in FIGS. 1 through 16, for example. In various embodiments, network interface 5040 may support communication via any suitable wired or wireless general data networks, such as types of Ethernet network, for example. Additionally, network interface 5040 may support communication via telecommunications/telephony networks such as analog voice networks or digital fiber communications networks, via storage area networks such as Fibre Channel SANs, or via any other suitable type of network and/or protocol.

In some embodiments, system memory 5020 may be one embodiment of a computer-accessible medium configured to store program instructions and data as described above for FIGS. 1 through 12 for detecting and responding to events in vehicles. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 5000 via I/O interface 5030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 5000 as system memory 5020 or another type of memory. Further, a computer-accessible medium may include transmission media or signals such as electrical, electromagnetic, or digital signals, conveyed via a communication medium such as a network and/or a wireless link, such as may be implemented via network interface 5040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of methods may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more devices on a provider network, the one or more devices including one or more processors coupled to a memory, the memory including instructions to:
   receive streams of sensor data over time from sensors of vehicles via an intermediate network, wherein the sensors include video cameras;
   analyze the sensor data received over time using one or more machine learning techniques to learn normal conditions and detect events including an anomalous event that represents a respective anomalous condition that differs from the normal conditions, in or around the vehicles, wherein the machine learning techniques include an unsupervised machine learning technique that applies the sensor data to unsupervised machine learning models to learn the normal conditions and to infer or predict anomalous events based on the streamed sensor data and the learned normal conditions, including to infer or predict those anomalous events related to road or traffic conditions, and those anomalous events in a physical environment around the vehicles that are not related to road or traffic conditions, and wherein:
   at least one of the anomalous events that is related to road or traffic conditions is inferred or predicted based on an analysis of the sensor data received from the sensors of two or more of the vehicles using at least the unsupervised machine learning technique; and
   at least one of the anomalous events that is not related to road or traffic conditions is inferred or predicted based on an analysis of the sensor data received from the sensors of two or more of the vehicles using at least the unsupervised machine learning technique; and
   in response to a detected event, perform one or more of:
   alert at least one entity of the detected event; or
   signal at least one vehicle system in at least one of the vehicles to respond to the detected event.

2. The system as recited in claim 1, wherein the machine learning techniques include a supervised machine learning technique that applies the sensor data to one or more machine learning models trained to detect known events in or around the vehicles.

3. The system as recited in claim 1, wherein, to analyze the sensor data using one or more machine learning techniques to detect events in or around the vehicles, the memory includes instructions to apply the machine learning techniques to detect an event related to multiple vehicles.

4. The system as recited in claim 1, wherein the memory further includes instructions to:

train a machine learning model to detect one or more
events related to a particular vehicle; and
download the machine learning model to a computing
system of the particular vehicle, wherein the computing
system includes a local detection module that:
analyzes sensor data from sensors of the particular
vehicle according to the machine learning model to
detect events related to the particular vehicle; and
in response to a detected event related to the particular
vehicle, performs one or more of:
alerts an entity associated with the particular vehicle
of the detected event; or
causes at least one vehicle system in the particular
vehicle to respond to the detected event.

5. The system as recited in claim 1, wherein the memory further includes instructions to:
train a machine learning model using unsupervised
machine learning and store the trained model; and
iteratively perform:
download the stored model to one or more of the
vehicles, wherein local detection modules executing
on computing systems of the vehicles further train
the model using unsupervised machine learning;
upload the model from at least one of the vehicles; and
integrate the uploaded model with the stored model.

6. The system as recited in claim 1,
wherein the memory further includes instructions to train
one or more machine learning models to recognize
features of one or more persons that are authorized to
operate or occupy a particular vehicle; and
wherein, to analyze the sensor data using one or more
machine learning techniques to detect events in or
around the particular vehicle, the memory includes
instructions to apply information about a person captured by one or more sensors of the particular vehicle
to the one or more machine learning models trained to
recognize the features of the one or more persons that
are authorized to operate or occupy the particular
vehicle to determine whether the person is authorized
to operate or occupy the particular vehicle.

7. A method, comprising:
performing, by an event detection service executing on
one or more devices on a provider network:
receiving, via an intermediate network, streams of
sensor data over time from sensors of vehicles;
analyzing the sensor data received over time using an
unsupervised machine learning technique that
applies the sensor data to machine learning models to
learn normal conditions and to infer or predict
anomalous events that represent a respective anomalous condition that differs from the normal conditions, in or around the vehicles based on the streamed
sensor data and the learned normal conditions,
including to infer or predict those anomalous events
related to road or traffic conditions and those anomalous events in a physical environment around the
vehicles that are not related to road or traffic conditions, and wherein:
at least one of the anomalous events that is related to
road or traffic conditions is inferred or predicted
based on an analysis of the sensor data received
from the sensors of two or more of the vehicles
using at least the unsupervised machine learning
technique; and
at least one of the anomalous events that is not
related to road or traffic conditions is inferred or
predicted based on an analysis of the sensor data
received from the sensors of two or more of the
vehicles using at least the unsupervised machine
learning technique; and
in response to a detected event, performing one or more
of:
alerting at least one entity of the detected event; or
signaling at least one vehicle system in at least one
of the vehicles to respond to the detected event.

8. The method as recited in claim 7, further comprising
analyzing the sensor data using a supervised machine learning technique that applies the sensor data to one or more
machine learning models trained to detect known events in
or around the vehicles.

9. The method as recited in claim 7, wherein the sensors
include external video cameras, wherein the sensor data
includes video of the physical environment captured by the
external video cameras, and wherein the method comprises
analyzing the video of the physical environment received
from the external video cameras of the two or more of the
vehicles using the unsupervised machine learning technique
to infer or predict anomalous events in the physical environment that are not related to road or traffic conditions.

10. The method as recited in claim 7, further comprising:
training a machine learning model to detect one or more
events related to a particular vehicle; and
downloading the machine learning model to a local detection module in the particular vehicle that performs:
analyzing sensor data from sensors of the particular
vehicle according to the machine learning model to
detect events related to the vehicle; and
in response to a detected event related to the particular
vehicle, performing one or more of alerting an entity
associated with the particular vehicle of the detected
event or causing at least one vehicle system in the
particular vehicle to respond to the detected event.

11. The method as recited in claim 10, wherein the
machine learning model is trained to recognize features of
one or more persons that are authorized to operate or occupy
the particular vehicle, wherein analyzing sensor data from
sensors of the particular vehicle according to the machine
learning model to detect events related to the particular
vehicle comprises applying information about a person
captured by one or more sensors of the vehicle to the
machine learning model to determine whether the person is
authorized to operate or occupy the particular vehicle.

12. The method as recited in claim 7, further comprising:
training one or more machine learning models to recognize features of one or more persons that are authorized
to operate or occupy a particular vehicle; and
applying information about a person captured by one or
more sensors of the particular vehicle to at least one of
the one or more machine learning models to determine
whether the person is authorized to operate or occupy
the particular vehicle.

13. The method as recited in claim 7, further comprising:
training one or more machine learning models to recognize normal driving of a person for a vehicle;
applying sensor data from the vehicle including video of
the person driving the vehicle captured by one or more
internal video cameras of the vehicle to the one or more
machine learning models to determine whether the
person is driving normally or abnormally; and
upon detecting abnormal driving behavior by the person,
performing one or more of alerting an entity of the
abnormal driving behavior or causing at least one
vehicle system in the vehicle to respond to the abnormal driving behavior.

14. The method as recited in claim 7, further comprising:
training a machine learning model using unsupervised machine learning and storing the trained model; and
iteratively performing:
downloading the stored model to a plurality of vehicles, wherein the model is further trained using unsupervised machine learning on the plurality of vehicles;
uploading the model from at least one of the plurality of vehicles; and
integrating the uploaded model with the stored model.

15. The method as recited in claim 7, wherein the sensors include one or more of video cameras, motion sensors, accelerometers, range sensors, global positioning sensors, sound sensors, engine sensors, throttle sensors, brake sensors, transmission sensors, suspension sensors, or steering sensors.

16. The method as recited in claim 7, wherein the at least one vehicle system includes one or more of ignition systems, engine control systems, throttle control systems, brake control systems, steering control systems, transmission control systems, suspension systems, vehicle light systems, vehicle alarm systems, vehicle lock systems, climate control systems, audio systems, display systems, or navigation systems.

17. A non-transitory computer-readable storage medium storing program instructions that are executable on a computing device to:
receive sensor data over time from sensors of vehicles, wherein the sensors include video cameras;
analyze the sensor data received over time, according to machine learning models using machine learning techniques to learn normal conditions and detect events in or around one or more of the vehicles, including one or more anomalous events that represent respective anomalous conditions that differ from the normal conditions, wherein the machine learning techniques include:
an unsupervised machine learning technique that applies the sensor data to the machine learning models to infer or predict the anomalous events based on the sensor data received from the sensors of two or more of the vehicles and based on the normal conditions, including to infer or predict those anomalous events related to road or traffic conditions and those anomalous events in a physical environment around the one or more vehicles that are not related to road or traffic conditions; and
a supervised machine learning technique that applies the sensor data to one or more of the machine learning models trained to detect known events in or around the one or more vehicles; and
in response to a detected event, perform one or more of:
alert at least one entity of the detected event; or
signal at least one vehicle system in at least one of the one or more vehicles to respond to the detected event.

18. The non-transitory computer-readable storage medium as recited in claim 17, wherein the computing device is an integrated computing system of one of a given one of the vehicles, and wherein the machine learning models are trained by an event detection system on a provider network and downloaded to the given one of the vehicles.

19. The non-transitory computer-readable storage medium as recited in claim 18, wherein the program instructions are executable on the computing device to:
receive, at the given one of the vehicles, sensor data from sensors of another one of the vehicles or another vehicle via a wireless connection; and
analyze the sensor data received from the sensors of the other one of the vehicles or the other vehicle according to the machine learning models using the machine learning techniques to detect events related to the other one of the vehicles or the other vehicle.

20. The non-transitory computer-readable storage medium as recited in claim 17, wherein the computing device is on a provider network, and wherein the sensor data is streamed to the computing device on the provider network from the vehicles via an intermediate network.

21. The non-transitory computer-readable storage medium as recited in claim 20, wherein the program instructions are executable on the computing device to analyze the sensor data from the two or more of the vehicles according to the machine learning models using the machine learning techniques to detect an event in or around the two or more of the vehicles.

* * * * *